(12) United States Patent
Finke et al.

(10) Patent No.: US 11,624,239 B1
(45) Date of Patent: *Apr. 11, 2023

(54) PULSE POWER DRILLING ASSEMBLY TRANSFORMER WITH A CORE HAVING INSULATIVE AND ELECTRICALLY CONDUCTIVE MATERIALS

(71) Applicant: Halliburton Energy Services, Inc., Houston, TX (US)

(72) Inventors: Michael D. Finke, Cypress, TX (US); Boguslaw Wiecek, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/453,604

(22) Filed: Nov. 4, 2021

(51) Int. Cl.
| | |
|---|---|
| *E21B 7/15* | (2006.01) |
| *E21B 41/00* | (2006.01) |
| *H01F 38/14* | (2006.01) |
| *H02K 7/18* | (2006.01) |
| *E21B 10/00* | (2006.01) |

(52) U.S. Cl.
CPC ............... *E21B 7/15* (2013.01); *E21B 10/00* (2013.01); *E21B 41/0085* (2013.01); *H01F 38/14* (2013.01); *H02K 7/1823* (2013.01)

(58) Field of Classification Search
CPC ........ E21B 7/15; E21B 10/00; E21B 41/0085; H01F 38/14; H02K 7/1823
See application file for complete search history.

(56) References Cited

U.S. PATENT DOCUMENTS

| | | | | |
|---|---|---|---|---|
| 3,142,029 A | * | 7/1964 | Keen, Jr. ................. | H01F 27/36 336/84 R |
| 3,158,207 A | * | 11/1964 | Rowley ................... | E21B 10/18 175/104 |
| 4,741,405 A | * | 5/1988 | Moeny .................... | E21B 7/007 175/16 |
| 4,899,834 A | * | 2/1990 | Weldon .................. | E21B 10/38 175/73 |

(Continued)

FOREIGN PATENT DOCUMENTS

| | | |
|---|---|---|
| CN | 110178447 | 8/2019 |
| WO | 2012006350 | 1/2012 |
| WO | 2015042608 A1 | 3/2015 |

OTHER PUBLICATIONS

"PCT Application No. PCT/US2022/074753, International Search Report and Written Opinion", dated Nov. 23, 2022, 9 pages.

(Continued)

*Primary Examiner* — Jonathan Malikasim
(74) *Attorney, Agent, or Firm* — Delizio, Peacock, Lewin & Guerra

(57) ABSTRACT

An apparatus comprises a sub-section of a pulse power drilling assembly including a transformer encircling a center flow tube. The transformer comprises at least one primary winding that encircles the center flow tube and a core that encircles the at least one primary winding. The core comprises an insulative material and an electrically conductive material, wherein the insulative material is positioned relative to the electrically conductive material to create at least one break to prevent an electrical path for current within the electrically conductive material during operation of the transformer. The transformer comprises a secondary winding that encircles the core.

20 Claims, 12 Drawing Sheets

(56) References Cited

U.S. PATENT DOCUMENTS

| | | | |
|---|---|---|---|
| 10,718,163 B2* | 7/2020 | Gilbrech | ................ E21B 10/00 |
| 2002/0036085 A1* | 3/2002 | Bass | .................. E21B 17/0285 |
| | | | 166/250.12 |
| 2016/0334352 A1 | 11/2016 | Fougere | |
| 2017/0265983 A1 | 9/2017 | Lam et al. | |
| 2017/0275983 A1 | 9/2017 | Goodman et al. | |
| 2018/0313158 A1 | 11/2018 | Gilbrech | |
| 2020/0063543 A1* | 2/2020 | Pai | ........................... E21B 7/15 |

OTHER PUBLICATIONS

"PCT Application No. PCT/US2022/074755, International Search Report and Written Opinion", dated Nov. 23, 2022, 9 pages.
"U.S. Appl. No. 17/453,626, Non-Final Office Action", dated Dec. 8, 2022, 14 pages.

* cited by examiner

PULSE POWER DRILLING ASSEMBLY TRANSFORMER WITH A CORE HAVING INSULATIVE AND ELECTRICALLY CONDUCTIVE MATERIALS

BACKGROUND

The disclosure generally relates to pulse power drilling and, more particularly, to transformers for pulse power drilling assemblies.

In drilling for oil and gas, kinetic energy of drilling fluid flowing through a drill string can be used to power downhole operations. However, in some instances, the power is not at the correct voltage to operate the components of a drilling assembly during downhole. In these instances, a transformer can be used to increase or decrease the voltage to a desired level to operate these components.

BRIEF DESCRIPTION OF THE DRAWINGS

Aspects of the disclosure may be better understood by referencing the accompanying drawings.

DESCRIPTION

Figure 1:
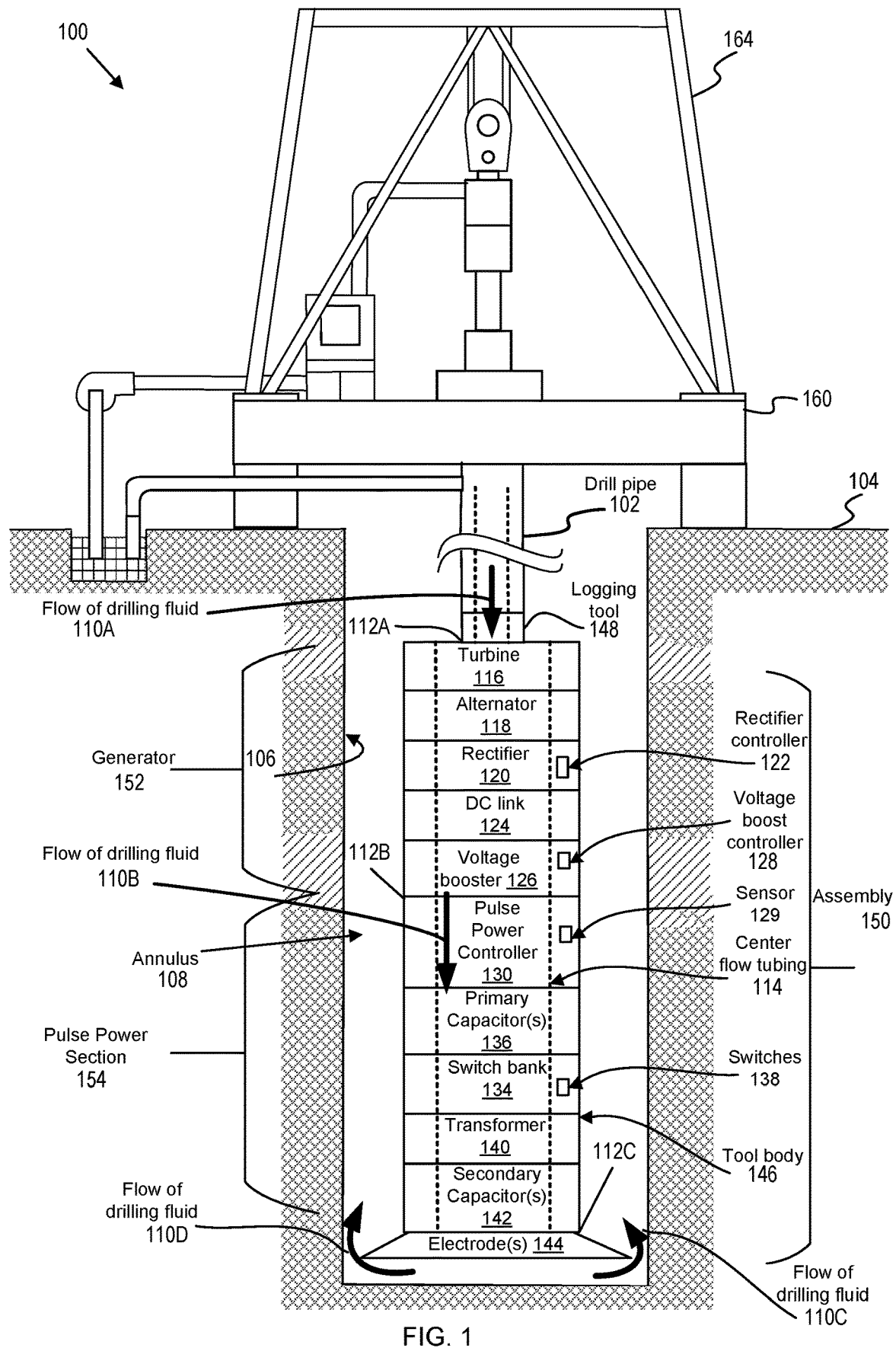
FIG. 1 depicts a pulse power drilling assembly with a transformer, according to some embodiments.

The description that follows includes example systems, methods, techniques, and program flows that embody aspects of the disclosure. However, it is understood that this disclosure may be practiced without these specific details. For instance, this disclosure refers to a set of primary and secondary windings of a transformer in illustrative examples. Aspects of this disclosure can be also applied to a transformer with more than two sets of windings. In other instances, well-known instruction instances, protocols, structures and techniques have not been shown in detail in order not to obfuscate the description.

The electrical devices that may be utilized by a pulsed power drilling assembly (hereinafter "assembly"), may include a power transformer. The power transformer (hereinafter "transformer") may be used in order to step-up voltages originally generated by other devices of the assembly, such as a turbine and an alternator combination, to one or more higher voltage levels that are ultimately delivered to electrodes being used by the assembly to perform drilling operations based on periodic pulses of electrical discharges into the subsurface formation.

Example pulse power drilling assemblies can have size and space restrictions imposed by a diameter of the borehole being drilled. These restrictions can introduce challenges to pulse power drilling because of the large amount of power and the operational requirements needed for pulse power operations. Some example embodiments include a transformer of the pulse power drilling assembly that is configured to meet the size and space restrictions while also satisfying the power and operational requirements needed for pulse power drilling.

In various examples, the transformer includes one or more primary windings that are arranged in electromagnetic coupling with one or more secondary windings of the transformer. The transformer provides a higher voltage level output at the secondary windings when electrical energy having lower voltage levels compared to the output voltage levels of the secondary windings is applied to the primary winding(s) of the transformer. The lower voltage levels applied to the primary winding may comprise a pulsed voltage waveform having switching time(s) at speeds up to 100 microseconds, and current levels of several hundred amperes. Due to the high switching rates, normal iron core type transformers would typically saturate, or have an inherent hysteresis that would not allow for the switching times required by the operating parameters needed for use in assembly.

Example embodiments of the transformer can include a core for the transformer formed from a solid ceramic tube separating the primary windings of the transformer from the secondary winding(s) of the transformer, while allowing close electromagnetic coupling between these sets of windings. Some embodiments of the core can include variations that include some portion of the core being formed from a metallic and conductive material, but arranged so that there is no continuous path for a flow of current within the metallic/conductive material that might be induced by the electromagnetic fields generated by either the primary or the secondary windings of the transformer during operation of the transformer.

Example Drilling Assembly

FIG. 1 depicts an example pulse power drilling assembly, according to some embodiments. FIG. 1 illustrates an example drilling apparatus 100. The example pulse power drilling apparatus 100 can include a pulse power drilling assembly (hereinafter "assembly") 150 positioned in a borehole 106 and secured to a length of drill pipe 102 coupled to a drilling platform 160 and a derrick 164. While depicted on the land 104 as an onshore drilling operation, example embodiments can also be performed as an offshore drilling operation. The assembly 150 can be configured to further the advancement of the borehole 106 using pulse electrical power generated by the assembly 150 and provided to electrodes 144 in a controlled manner to emit an electrical discharge through the formation material of a subsurface formation along the bottom face of the borehole 106 and in the nearby proximity to the electrodes 144. This discharge can create high internal pressure to destroy the formation material from the inside. In other words, the electrical discharge can create a superheated condition in the fluid in the formation material—resulting in micro-explosions in the formation material. Thus, the formation material can break from tension from within caused by the emitted electrical discharge.

As illustrated in FIG. 1, the assembly 150 includes multiple sub-assemblies, including, in some embodiments, a turbine 116 at a top of the assembly 150 where the top of the assembly is a face of the assembly 150 furthest from a drilling face of the assembly 150 (which contains the electrodes 144). The turbine 116 is coupled to multiple additional sub-sections or components. These additional sub-sections or components may include various combinations of an alternator sub-section or component of the assembly (hereinafter "alternator") 118, a rectifier 120, a rectifier controller 122, a direct current (DC) link 124, a voltage booster 126, a voltage boost controller 128, a pulse power controller 130, the sensor 129, one or more primary capacitor(s) 136, a switch bank 134 (including one or more switches 138), a transformer 140, one or more secondary capacitors 142, and the electrodes 144.

The assembly 150 can be divided into a generator 152 and a pulse power section 154. The generator 152 can include the turbine 116, the alternator 118, the rectifier 120, the rectifier controller 122, the DC link 124, the voltage booster 126, and the voltage boost controller 128. The pulse power section 154 can include the pulse power controller 130, the sensor 129, the one or more primary capacitor(s) 136, the switch bank 134, the switches 138, the transformer 140, the one or more secondary capacitors 142, and the electrodes 144. Components can be divided between the generator 152 and the pulse power section 154 in other arrangements, and the order of the components can be other than shown.

In some embodiments, the rectifier 120, the DC link 124, and the voltage booster 126 may be referred to as a "power conditioning system", or PCS. These additional sub-assemblies of the PCS may be electrically coupled to receive the electrical power output generated by the alternator 118 and to provide further processing of the received electrical power in order to provide a conditioned electrical power output comprising conditioned electrical power. This further processing of the electrical power output received at the PCS may include rectification, voltage boosting, and frequency and/or waveform smoothing or regulating of the received electrical power. In operation, the rectifier controller 122 may control rectification functions performed by the PCS, while the voltage boost controller 128 may control voltage boosting functions being performed by the PCS.

The assembly 150 may be comprised of multiple sub-sections, with a joint used to couple each of these sub-sections together in a desired arrangement to form the assembly 150. Field joints 112A-C can be used to couple the generator 152 and the pulse power section 154 to construct the assembly 150 and to couple the assembly 150 to the drill pipe 102. In some embodiments, the assembly 150 may include one or more additional field joints coupling various components of the assembly 150 together. Field joints may be places where the assembly 150 is assembled or disassembled in the field, for example at the drill site. In addition, the assembly 150 may require one or more joints referred to as shop joints that are configured to allow various sub-sections of the assembly 150 to be coupled together (for example at an assembly plant or at a factory). For example, various components of the assembly 150 may be provided by different manufacturers, or assembled at different locations, which require assembly before being shipped to the field.

Regardless of whether a joint in the assembly 150 is referred to as a field joint or a shop joint, the center flow tubing 114 extends through any of the components that include the center flow tubing 114. A joint between separate sections of the center flow tubing 114 or a hydraulic seal capable of sealing the flow of the drilling fluid within the center flow tubing 114 may be formed to prevent leaking at the joints.

A flow of drilling fluid (illustrated by the arrow 110A pointing downward within the drill pipe 102) can be provided from the drilling platform 160, and flow to and through the turbine 116, exiting the turbine 116 and flowing on into other sub-sections or components of the assembly 150, as indicated by the arrow 110B. The flow of drilling fluid through the turbine 116 can cause the turbine 116 to be mechanically rotated. This mechanical rotation can be coupled to the alternator 118 in order to generate electrical power. The PCS can further process and controllably provide the electrical power to the rest of the downstream assembly 150. The stored power can then be output from the electrodes 144 in order to perform the advancement of the borehole 106 via periodic electrical discharges. The flow of drilling fluid can then exit at the bottom of the assembly 150 and return to the surface of the borehole 106 via the annulus 108 (illustrated by the arrows 110C and 110D).

The drilling fluid can flow through the assembly 150, as indicated by arrow 110B, and flow out and away from the electrodes 144 and back toward the surface to aid in the removal of the debris generated by the breaking up of the formation material at and nearby the electrodes 144. The fluid flow direction away from the electrodes 144 is indicated by arrows 110C and 110D. In addition, the flow of drilling fluid may provide cooling to one or more devices and to one or more portions of the assembly 150. In various embodiments, it is not necessary for the assembly 150 to be rotated as part of the drilling process, but some degree of rotation or oscillations of the assembly 150 may be provided in various embodiments of drilling processes utilizing the assembly 150, including internal rotations occurring at the turbine 116, in the alternator sub-section, etc.

The flow of drilling fluid passing through the turbine 116 can continue to flow through one or more sections of a center flow tubing 114, which thereby provides a flow path for the drilling fluid through one or more sub-sections or components of the assembly 150 positioned between the turbine 116 and the electrodes 144, as indicated by the arrow 110B pointing downward through the cavity of the sections of the center flow tubing 114. Once arriving at the electrodes 144, the flow of drilling fluid can be expelled out from one or more ports or nozzles located in or in proximity to the electrodes 144. After being expelled from the assembly 150, the drilling fluid can flow back upward toward the surface through an annulus 108 created between the assembly 150 and walls of the borehole 106.

The center flow tubing 114 may be located along a central longitudinal axis of the assembly 150 and may have an overall outside diameter or outer shaped surface that is smaller in cross-section than the inside surface of a tool body 146 in cross-section. As such, one or more spaces can be created between the center flow tubing 114 and an inside wall of the tool body 146. These one or more spaces may be used to house various components, such as components which make up the alternator 118, the rectifier 120, the rectifier controller 122, the DC link 124, the voltage booster 126, the voltage boost controller 128, the sensor 129, the pulse power controller 130, the one or more primary capacitor(s) 136, the switch bank 134, the one or more switches 138, the transformer 140, and the one or more secondary capacitors 142, as shown in FIG. 1. The sensor 129 can be located in different locations within the assembly. In this example, the sensor 129 is positioned near the pulse power controller 130 but can be in any location within the assembly 150 (depending on the size and particular sensor measurement). Other components may be included in the spaces created between the center flow tubing 114 and the inside wall of the tool body 146.

The transformer 140 may be referred to as a "tubular transformer" in that the windings of the transformer, including one or more primary windings and one or more secondary windings, are wound around a center flow tubing 114 extending through the windings of the transformer and along a longitudinal axis of the example drilling apparatus 100. The windings form tubular shaped sets of windings having different diameters in cross-section for the primary versus secondary windings. In various embodiments, an inner set of windings comprising either the primary winding(s) or the second winding(s), are formed as coil(s) wound around and in contact with or in close proximity to an outer surface of the center flow tubing 114, thus encircling a portion of the center flow tubing 114 along a longitudinal length of the center flow tube.

A corresponding set of outer set of winding(s), comprising either the secondary or primary windings of the transformer 140 not included as part of the inner set of windings, is/are formed as one or more coils wound to encircle a portion of the center flow tubing 114 and to also encircle the inner set of coils. The outer set of winding encircles at least some portion of the center flow tubing 114 along the longitudinal axis of the example drilling apparatus 100 that corresponds with the portion of the center flow tubing 114 encircled by the inner windings.

A core material may be provided in a space between the inner set of windings and the outer set of windings. In various embodiments, the core comprises a tubular shape formed of an electrically non-conductive material, such as a ceramic material, and encircling the center flow tube and the inner set of windings. In various embodiments, the core comprises a tubular shape formed in part from a conductive material, such as a metal, that is constructed to prevent an electrical path for any currents that might be generated in the conductive material during the operation of the transformer from having a completed electrical path to flow through. Thus, the conductive material may strengthen the electromagnetic coupling available between the inner set of windings and the outer set of windings of the transformer while preventing losses due to current flows induced into the conductive material provided as part of the core of the transformer.

The center flow tubing 114 can seal the flow of drilling fluid within the hollow passageways included within the center flow tubing 114 and at each joint coupling sections of the center flow tubing 114 together to prevent the drilling fluid from leaking into or otherwise gaining access to these spaces between the center flow tubing 114 and the inside wall of the tool body 146. Leakage of the drilling fluid outside the center flow tubing 114 and within the assembly 150 may cause damage to the electrical components or other devices located in these spaces and/or may contaminate fluids, such as lubrication oils, contained within these spaces, which may impair or completely impede the operation of the assembly 150 with respect to drilling operations.

The example pulse power drilling apparatus 100 can include one or more logging tools 148. The logging tools 148 are shown as being located on the drill pipe 102, above the assembly 150, but can also be included within the assembly 150 or joined via shop joint or field joint to assembly 150. The logging tools 148 can include one or more logging with drilling (LWD) or measurement while drilling (MWD) tool, including resistivity, gamma-ray, nuclear magnetic resonance (NMR), etc. The logging tools 148 can include one or more sensors to collect data downhole. For example, the logging tools 148 can include pressure sensors, flowmeters, etc. The example pulse power drilling apparatus 100 can also include directional control, such as for geosteering or directional drilling, which can be part of the assembly 150, the logging tools 148, or located elsewhere on the drill pipe 102.

Communication from the pulse power controller 130 to the voltage boost controller 128 allows the pulse power controller 130 to transmit data about and modifications for pulse power drilling to the generator 152. Similarly, communication from the voltage boost controller 128 to the pulse power controller 130 allows the generator 152 to transmit data about and modifications for pulse power drilling to the pulse power section 154. The pulse power controller 130 can control the discharge of the pulse power stored for emissions out from the electrodes 144 and into the formation, into drilling mud, or into a combination of formation and drilling fluids. The pulse power controller 130 can measure data about the electrical characteristics of each of the electrical discharges—such as power, current, and voltage emitted by the electrodes 144. Based on information measured for each discharge, the pulse power controller 130 can determine information about drilling and about the electrodes 144, including whether or not the electrodes 144 are firing into the formation (i.e. drilling) or firing into the formation fluid (i.e. electrodes 144 are off bottom). The generator 152 can control the charge rate and charge voltage for each of the multiple pulse power electrical discharges. The PCS, together with the turbine 116 and alternator 118, can create an electrical charge in the range of 16 kilovolts (kV) which the pulse power controller 130 delivers to the formation via the electrodes 144.

When the pulse power controller 130 can communicate with the generator 152, the generator 152 and the alternator 118 can ramp up and ramp down in response to changes or electrical discharge characteristics detected at the pulse power controller 130. Because the load on the turbine 116, the alternator 118, and the generator 152 is large (due to the high voltage), ramping up and ramping down in response to the needs of the pulse power controller 130 can protect the generator 152 and associated components from load stress and can extend the lifetime of components of the pulse power drilling assembly. If the pulse power controller 130 cannot communicate with the generator 152, then the generator 152 may apply a constant charge rate and charge voltage to the electrodes 144 or otherwise respond slowly to downhole changes—which would be the case if the generator 152 is controlled by the drilling mud flow rate adjusted at the surface or another surface control mechanism.

In instances where the assembly 150 is off bottom, electrical power input to the system can be absorbed (at least partially) by drilling fluid, which can be vaporized, boiled off, or destroyed because of the large power load transmitted in the electrical pulses. In instances where the assembly 150 is not operating correctly, such as when one or more switch experiences a fault or requires a reset, application of high power to the capacitors 136/142 or the electrodes 144 can damage circuitry and switches when applied at unexpected or incorrect times. In these and additional cases, communications or messages between the pulse power controller 130 and the generator 152 allow the entire assembly to vary charge rates and voltages, along with other adjustments further discussed below. In cases where the pulse power controller 130 and generator 152 are autonomous, i.e. not readily in communication with the surface, downhole control of the assembly 150 can improve pulse power drilling function.

Example Transformers

Figure 2A:
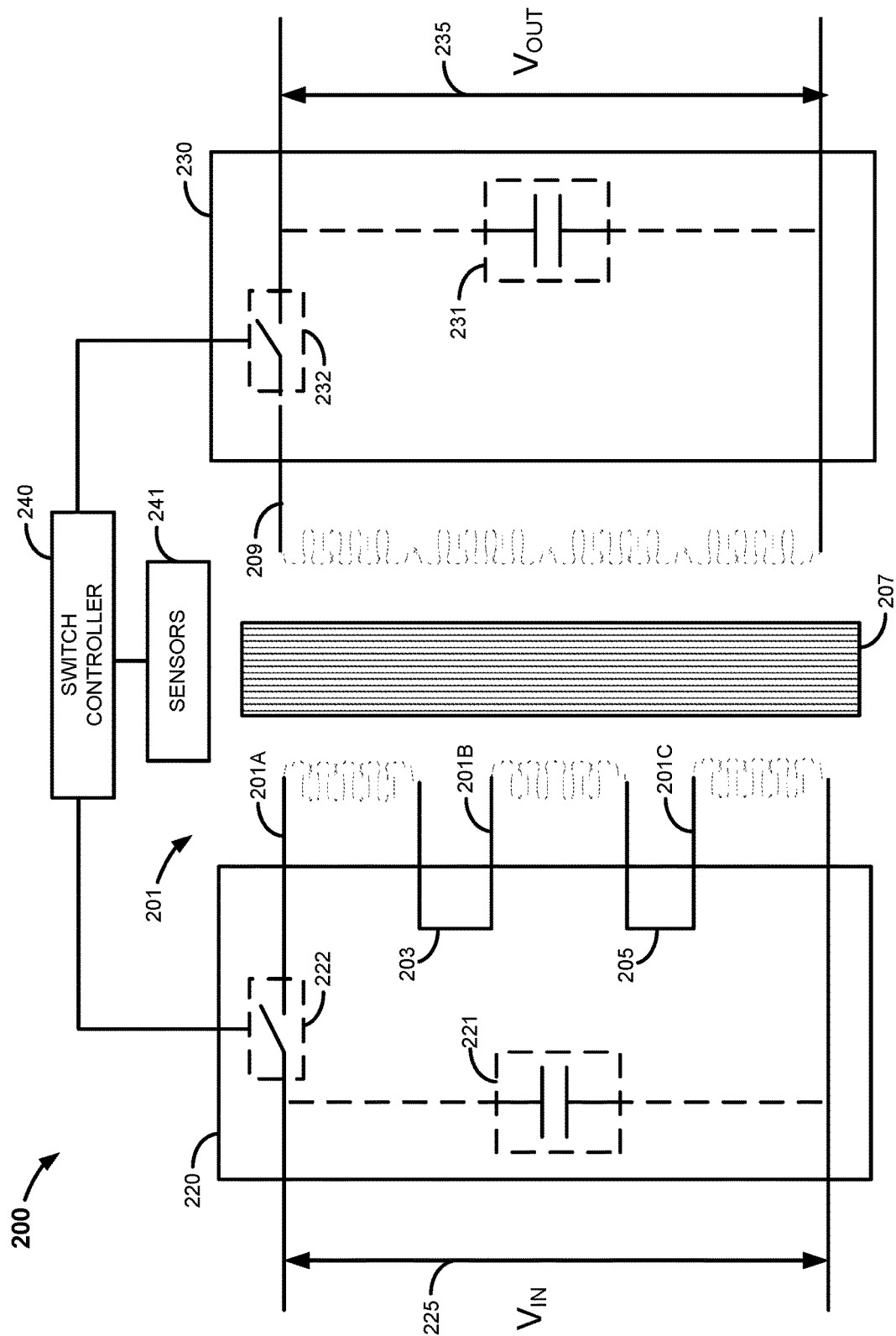
FIG. 2A illustrates a schematic diagram of a portion of a pulse power drilling apparatus including a transformer, according to some embodiments.

FIG. 2A illustrates a schematic diagram of a portion of a pulse power drilling apparatus 200 including a transformer 201, according to some embodiments. The transformer 201 illustrated in FIG. 2A in various embodiments may be transformer 140 utilized in assembly 100 as illustrated and described above with respect to FIG. 1. As shown in FIG. 2A, transformer 201 includes primary windings 201A, 201B, 201C, a secondary winding 209, and a core 207 positioned between the primary windings and the secondary winding. Primary winding 201A is electrically coupled in series with primary winding 201B through electrical connection 203, and primary winding 201B is electrically coupled in series with primary winding 201C through electrical connection 205. The series coupled primary windings 201A, 201B, 201C are coupled in parallel with primary capacitor bank 220, which includes one or more capacitor(s) 221, and in parallel with input conductors configured to provide an input voltage $V_{IN}$ 225 across the primary capacitor(s) 221 and primary windings 201A, 201B, 201C.

Primary windings 201A, 201B, 201C are electrically isolated from secondary winding 209, but are electromagnetically coupled to secondary winding 209 at least through core 207. Secondary winding 209 is electrically coupled in parallel with secondary capacitor bank 230, which includes one or more secondary capacitor(s) 231, and in parallel with output conductors configured to provide an output voltage $V_{OUT}$ 235 across the secondary winding 209 and the secondary capacitor(s) 231. In various embodiments, transformer 201 is configured to receive input voltage $V_{IN}$ 225 across the primary windings 201A, 201B, 201C as a first voltage, and to provide an output voltage $V_{OUT}$ 235 across the secondary winding 209, wherein the voltage level of $V_{OUT}$ 235 is higher than the voltage level $V_{IN}$ 225 provided across the primary windings 201A, 201B, 201C.

In various embodiments, primary capacitor bank 220 may include primary switch 222 configured to electrically connect and disconnect input voltage $V_{IN}$ 225 to and from, respectively, primary windings 201A, 201B, 201C. In various embodiments, primary switch 222 may be positioned so that operation of the switch connects or disconnects primary windings 201A, 201B, 201C from primary capacitor(s) 221. The operation of primary switch 222 may be utilized to control the overall power level provided to transformer 201, and/or as a safety feature used to disconnect electrical power from the primary windings of transformer 201 when a fault condition, such as an electrical overload, electrical short, and/or an overtemperature condition is detected.

In various embodiments, secondary capacitor bank 230 may include secondary switch 232 configured to electrically connect and disconnect secondary winding 209 from the output conductors configured to provide output voltage $V_{OUT}$ 235 to additional portions of the pulse power drilling assembly. In various embodiments, secondary switch 232 may be positioned so that operation of the switch connects or disconnects secondary winding 209 from secondary capacitor(s) 231. The operation of secondary switch 232 may be utilized to control the overall power level provided as an electrical output from transformer 201, and/or as a safety feature used to disconnect any electrical output power generated by transformer 201 when a fault condition, such as an electrical overload, electrical short, and/or an overtemperature condition is detected.

As shown in FIG. 2A, primary switch 222 and secondary switch 232 are coupled to switch controller 240. In various embodiments, switch controller 240 is configured to control the operation of primary switch 222 to connect and disconnect the primary windings 201A, 201B, 201C to and from, respectively, input voltage $V_{IN}$ 225 and/or primary capacitor(s) 221. In various embodiments, switch controller 240 is configured to control the operation of secondary switch 232 to connect and disconnect the secondary windings 209 to and from, respectively, the conductors providing output voltage $V_{OUT}$ 235 and/or secondary capacitor(s) 231. Switch controller 240 is not limited to any particular kind of controller or control device, and in various embodiments may be a separate controller, such as computer device, as illustrated and described below with respect to FIG. 7, and/or may be provided by and incorporated into any of the controllers described throughout this disclosure, and/or any equivalents thereof.

In various embodiments, one or more sensors 241 are coupled to switch controller 240. Sensors 241 are not limited to any particular type or types of sensors, and may include any type of sensor configured to provide an output signal, such as an electrical and/or an optical output signal, that corresponds to some parameter or parameters being detected and/or measured by the sensor. In various examples, sensors 241 may include one or more sensors configured to measure electrical parameters, such as voltage levels at $V_{IN}$ 225 and/or voltage levels present across primary windings 201A, 201B, 201C, and provide an output signal to switch controller 240 indicative of the measured voltage level(s). In various examples, sensors 241 may include one or more sensors configured to measure electrical parameters, such as voltage levels at $V_{OUT}$ 235 and/or voltage levels present across secondary windings 209, and provide one or more output signals to switch controller 240 indicative of the measured voltage level(s). In various embodiments, sensors 241 may include one or more sensors configured to measure one or more electrical current levels, such as current flow into or out of primary capacitors 221, through primary windings 201A, 201B, 201C, into or out of secondary capacitors 231, and/or through secondary winding 209, and provide one or more output signals to switch controller 240 indicative of the measured current level(s). In various embodiments, sensors 241 may include one or more sensors configured to measure temperature levels at one or more locations within apparatus 200, such as the temperature level of the primary windings, the core, and/or the secondary windings of transformer 201, primary capacitors 221, secondary capacitors 231, and/or area proximate to and/or surrounding transformer 201 and/or the capacitors banks 220, 230, and to provide one or more output signals to switch controller 240 indicative of the measured temperature level(s). In various embodiments, switch controller 240 may be configured to control the operation of primary switch 222 and/or secondary switch 232 based at least in part on the signals provided to the switch controller by sensors 241.

Although primary capacitors 221 are illustrated in FIG. 2A as a single capacitor, primary capacitors 221 may comprise a number of series coupled capacitors, a number of parallel coupled capacitors, and/or a network of series/parallel coupled capacitors. The arrangement and electrical coupling of the primary capacitors may be configured to allow the primary capacitors to receive and safely store electrical energy provided as $V_{IN}$ 225. Primary windings 201A, 201B, 201C are also configured with respect to insulative properties and current carrying capacity to receive and safely operate within the electrical ranges for voltage and current provided to the primary windings as $V_{IN}$ 225 and from primary capacitor(s) 221. In various embodiments, primary windings 201A, 201B, 201C of transformer 201 are configured to operate within a voltage range of zero to 20,000 Volts (peak to peak), and carry current flow in a range of zero to 300,000 Amperes. In various embodiments, the secondary winding 209 of transformer 201 is configured to operate within a voltage range of zero to 160,000 Volts (peak to peak), and carry current flow in a range of zero to 200,000 Amperes. In various embodiments, transformer 201 is configured to have a power rating of between 100 and 300 kWatts. In various embodiments, transformer 201 is configured to operate within a frequency range from 0 to 500 kilo-Hertz, inclusive. In various embodiments, transformer 201 is configured to operate over a temperature range of 75 to 300 degrees F. (25 to 150 degrees C.). The above-listed ranges and dimensions are non-limiting examples, because such ranges and dimensions can have other values depending on the material and other design parameters.

In various implementations, transformer 201 is configured to be positioned and operate when at least partially or fully submersed in a fluid, such as an oil, wherein the fluid may be in contact with any or all of the primary windings, the core, and/or the secondary winding of transformer 201, and in various implementations may provide cooling and/or temperature control for the transformer. The fluid may reside and/or circulate through the primary windings, around the core, and through the secondary winding of the transformer. In addition to or in the alternative to any cooling provided to the transformer through the fluid in which the transformer may be immersed, the transformer may be cooled through thermal transfer of heat from the transformer or the area(s) around the transformer through the center flow tube and to a flow of fluid, such as drilling fluid, passing through the center flow tube.

In various embodiments, the number of primary windings included in the transformer 201 may be determined at least in part based on the arrangement and the electrical parameters, such as voltage and current carrying requirements, associated with the banks of capacitors included in the primary capacitor(s) 221 coupled to the primary windings 201A, 201B, 201C. In various examples, the current carrying reequipments for the primary capacitor(s) 221 may dictate that the capacitor banks be divided into two or more electrically separate banks of capacitors, each bank electrically coupled to an individual and separate coil windings of the primary windings 201A, 201B, 201C of the transformer 201 in order to safely handle the current levels required to provide the overall power needed to be provided to and transferred through the transformer, an example of which is further illustrated and described below with respect to FIG. 2B.

Referring again to FIG. 2A, in operation electrical energy provided to the primary windings 201A, 201B, 201C of the transformer 201 generates an electromagnetic field that induces electrical currents in the secondary winding 209 of the transformer. The electrical energy associated with these induced currents is then controllably stored into a secondary capacitor(s) 231 that is electrically coupled to the secondary winding 209, and may be provided as output voltage $V_{OUT}$ 235.

Core 207 as shown in FIG. 2A may provide both the function of physical support for physical conductors, such as a wire, used to form the primary windings and/or the secondary winding of the transformer, and in some embodiments allows for more efficient coupling of the electromagnetic fields generated by the primary windings and utilized to induce currents in the secondary winding. In various embodiments, the core 207 is formed of an electrically insulative material, such as a ceramic. In various embodiments, the core 207 may be formed, at least in part, from an electrically conductive material, such as a metal. The core 207 in various embodiments allows the distance between the primary windings 201A, 201B, 201C and the secondary winding 209 to be smaller compared to instances where no core or an air core would be utilized, and thus helps reduce the overall amount of space required within the apparatus 200 needed to house the transformer 201. Further, embodiments of the core 207 may be tube shaped and allow for accommodation of a center flow tube configured to carry drilling fluid passing through a fluid passageway that is encircled by the transformer 201. The primary windings 201A, 201B, 201C and the secondary winding 209 of the transformer 201 may be arranged to encircle the center flow tube and maintain a separation between these windings using the core as the separating means.

Figure 2B:
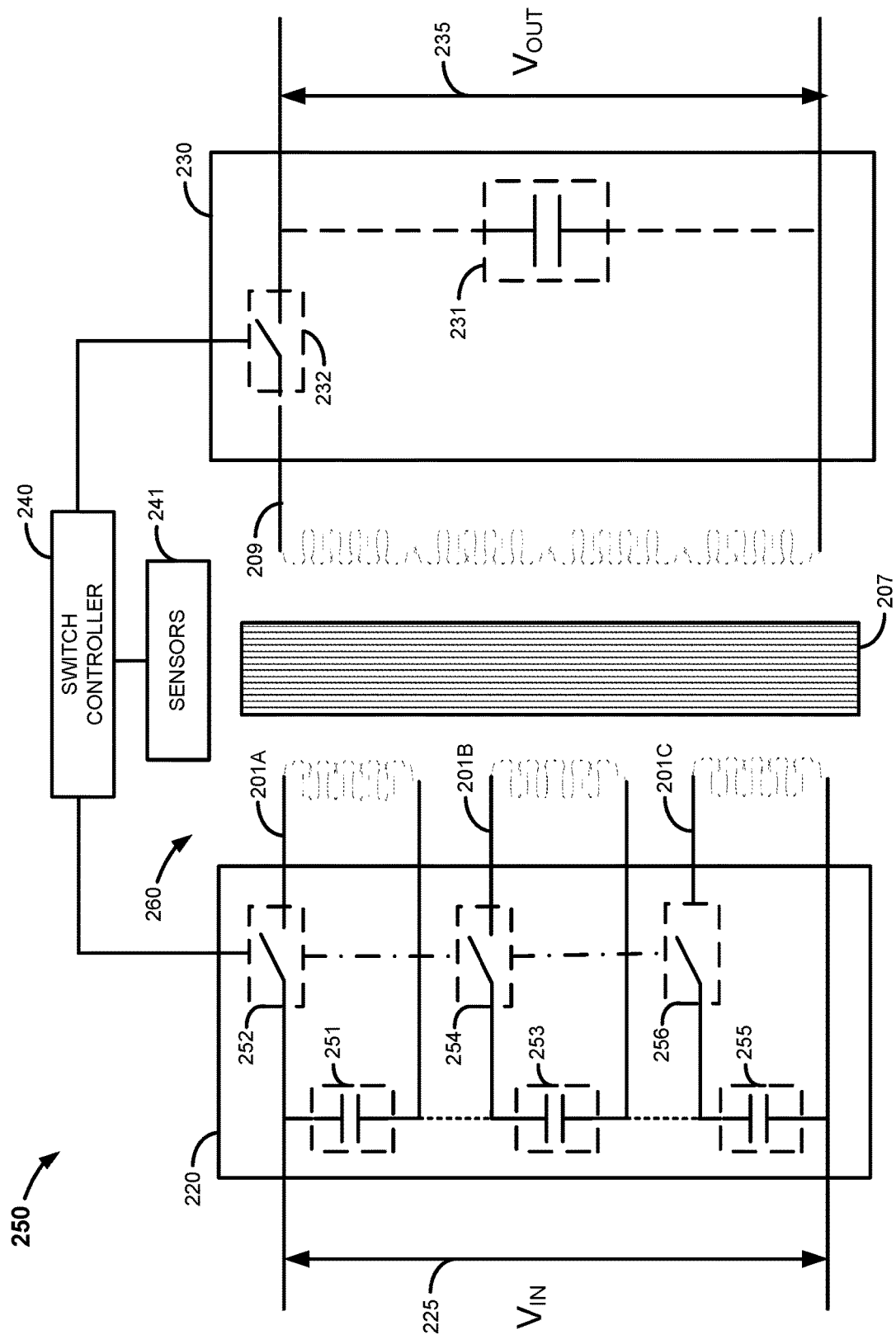
FIG. 2B illustrates a schematic diagram of a portion of a pulse power drilling apparatus including a transformer, according to some embodiments.

FIG. 2B illustrates a schematic diagram of a portion of a pulse power drilling apparatus 250 including a transformer 260, according to some embodiments. Apparatus 250 as illustrated in FIG. 2B may include the same components and/or electrical connections arranged in a same or similar manner as illustrated and described above with respect to apparatus 200 and transformer 201, with differences between apparatus 200 and 250 as described below. Components that relate to a same or similar device in FIGS. 2A and 2B retain the same reference number in both figures and may provide the same features and perform the same or similar functions in each of these apparatuses.

A shown in FIG. 2B, transformer 260 includes three primary windings 201A, 201B, 201C, a secondary winding 209, and a core 207 positioned between the primary and secondary windings. As further illustrated in FIG. 2B, each of the primary windings 201A, 201B, 201C, is coupled to a respective and separate set of primary capacitor(s). Embodiments of transformer 260 are not limed to having three primary windings, and may have a plurality of primary windings more or less than three in number, wherein each of the primary windings may be individually coupled to a separate set of primary capacitors in a manner the same or similar to that illustrated in FIG. 2B.

For example, primary winding 201A may be coupled in parallel with primary capacitor(s) 251, wherein primary capacitor(s) 251 may include a number of series connected capacitors, a number of parallel connected capacitor(s), and/or a number of series/parallel connected capacitors. A switch 252 may be connected between primary winding 201A and configured to connect and disconnect primary winding 201A to and from, respectively, primary capacitor(s) 251. Primary winding 201B may be coupled in parallel with primary capacitor(s) 253, wherein primary capacitor(s) 253 may include a number of series connected capacitor(s), a number of parallel connected capacitor(s), and/or a number of series/parallel connected capacitors. A switch 254 may be connected between primary winding 201B and configured to connect and disconnect primary winding 201B to and from, respectively, primary capacitor(s) 253. Primary winding 201C may be coupled in parallel with primary capacitor(s) 255, wherein primary capacitor(s) 255 may include a number of series connected capacitor(s), a number of parallel connected capacitor(s), and/or a number of series/parallel connected capacitors. A switch 256 may be connected between primary winding 201C and configured to connect and disconnect primary winding 201C to and from, respectively, primary capacitor(s) 255.

In various embodiments, the arrangement of the capacitors(s) within each one of the sets of primary capacitor(s) 251, 253, 255 is a same arrangement with respect to series and/or parallel coupling of the capacitors within the set. In various embodiments, the arrangement of the capacitors(s) within one or more of the sets of primary capacitor(s) 251, 253, 255 is a different arrangement of the capacitor(s) with respect to series and/or parallel coupling of the capacitors within at least one other of the sets of primary capacitor(s).

Based on the arrangements of the primary capacitor(s) 251, 253, 255, each of these sets or primary capacitors may be configured to impress a respective voltage level across the respective one of primary windings 201A, 201B, 201C to which that set of primary capacitors is coupled in parallel with. In various embodiments, each of primary capacitor(s) 251, 253, 255 may be coupled together in series with one another and in parallel with the input conductors providing the input voltage $V_{IN}$ 225 so that each of the primary capacitor(s) has a voltage level across the capacitors in that set of primary capacitors that is less than the total voltage level provided at $V_{IN}$ 225. For example, primary capacitor(s) 251, 253, 255 may be configured so that each of these sets of primary capacitor(s) has an amount equal to approximately one third of the input voltage $V_{IN}$ 225 applied across the respective capacitor(s) included in that set of primary capacitors. In various embodiments, primary capacitor(s) 251, 253, 255 may be configured so that each of these sets of primary capacitor(s) has a different voltage level applied across the capacitor(s) including in a particular one of sets of primary capacitor(s) compared to a voltage level or voltage levels applied across other capacitors of a different one or ones of the primary capacitor(s).

In various embodiments, each of switches 252, 254, 256 may be controlled by switch controller 240 in order to control the coupling of the primary windings 201A, 201B, 201C with the respective ones of the primary capacitor(s) 251, 253, 255. Switches 252, 254, 256 are not limited to any particular type of switching device, and may be any switching device configured to provide electrical coupling between primary winding 201A, 201B, 201C and the capacitor(s) included in capacitor bank 220, including a solid state switching device, such as a MOSFET device. By separately coupling each of the primary windings 201A, 201B, 201C to individual sets of primary capacitor(s), the overall voltage rating level, and thus the voltage rating for insulation used for insulating the windings of the primary windings may be reduced, while still allowing transformer 260 to provide a higher level of overall power passing through the primary circuitry of the transformer. In various embodiments, by individually switching on and off individual ones of the primary windings 201A, 201B, 201C while maintaining voltage(s) on one or more of the primary windings but not on all of the primary windings, the overall power levels passing through the transformers may also be controlled.

Figure 3:
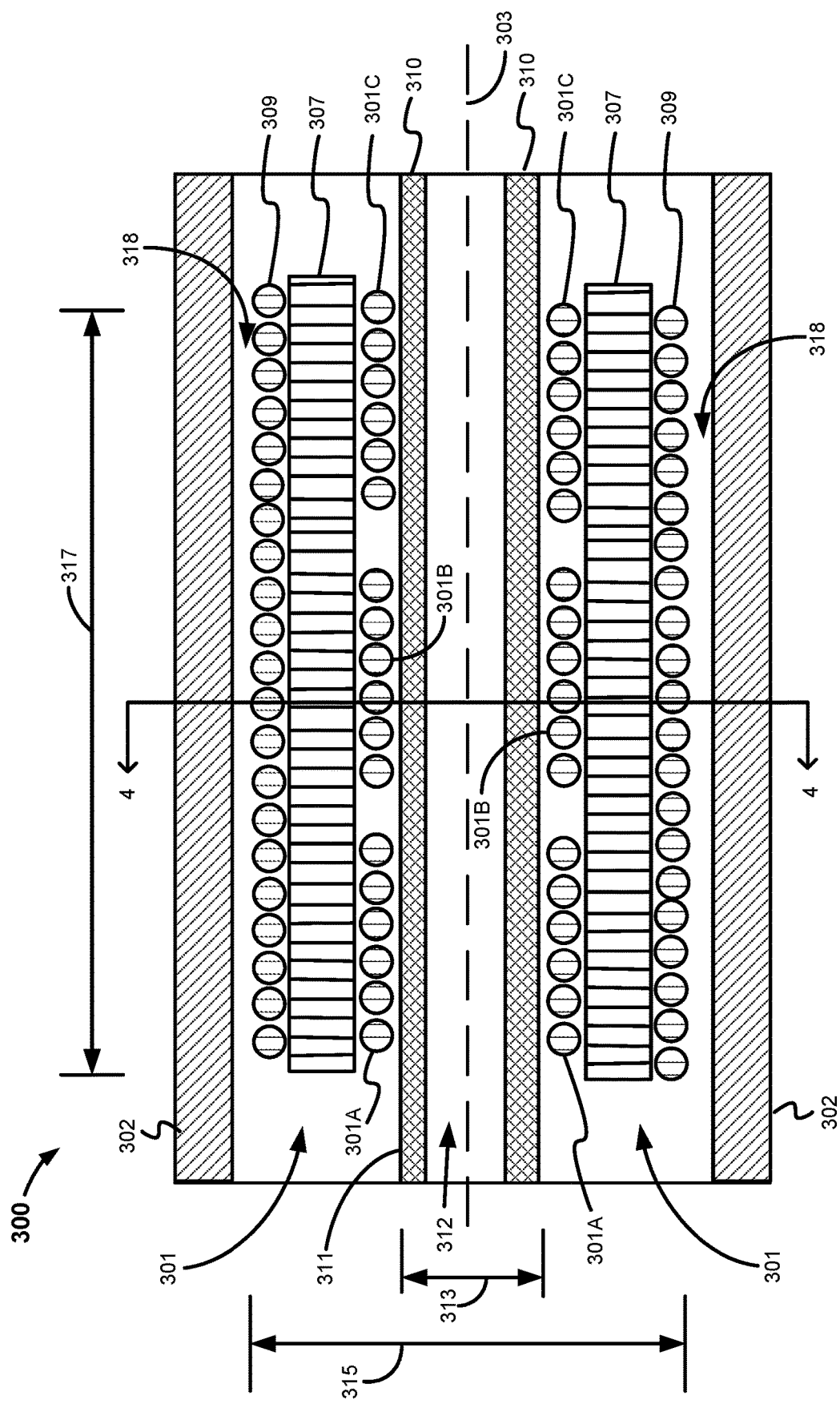
FIG. 3 illustrates a cut-away side view of a sub-section of an assembly that includes a transformer, according to various embodiments.

FIG. 3 illustrates a cut-away side view of a sub-section 300 of a pulse power drilling assembly that includes a transformer 301, according to various embodiments. As shown in FIG. 3, the cut-away view of sub-section 300 extends along the longitudinal axis 303 of the assembly. As shown in FIG. 3, sub-section 300 includes a center flow tube 310 positioned inside tool body 302. The center flow tube 310 includes a fluid passageway 312 that extends along the longitudinal axis 303 of the tool body 302. The center flow tube 310 in some embodiments is formed from an electrically non-conductive material, such as a ceramic. In some embodiments, the fluid passageway 312 extends through the entirety of the center flow tube 310 and provides a flow path for a drilling fluid to pass through the sub-section 300 including the transformer 301 when the sub-section 300 including the transformer 301 is coupled to adjoining sub-sections of the assembly.

One more primary windings 301A, 301B, 301C formed from electrical conductors such as wires, are formed as coil windings that encircle the center flow tube 310. The electrical conductors are not limited to comprising a particular type of material, and may comprise a metal or metallic compound or metal alloy, such as copper, aluminum, a compound of iron, or a non-metallic electrically conductive material, such as a carbon based material. As shown in FIG. 3, there are three primary windings encircling the center flow tube 310, although embodiments of the transformer 301 may have more or a fewer number of primary windings. Although shown in FIG. 3 as being circular in cross-section, the cross-sectional shape of the electrical conductors forming primary windings 301A, 301B, 301C are not limited to being circular. In various embodiments, the electrical conductors forming primary windings 301A, 301B, 301C may have any closed shape in cross-section, including square, rectangular, triangular, elliptical, oval shapes. In various embodiments, the areas of each of the conductors forming the primary windings 301A, 301B, 301C may be in a range of 0.030 to 0.5 square inches, inclusive. The above-listed range is a non-limiting example, because this range can have other values depending on the material and other design parameters.

In various embodiments, a center point of each winding of the primary windings 301A, 301B, and 301C may align with the center points of each of the other windings of the primary windings so that the center points fall along a line that is parallel to longitudinal axis 303. In various embodiments, a center point of a winding of the primary windings may be staggered with respect to a distance between the center point and longitudinal axis 303 so that the conductors forming the primary windings do not align along a single line parallel to longitudinal axis 303, but, for example, may have adjacent windings formed at a different distance from the longitudinal axis 303. In various embodiments, each of the primary windings includes a single layer of electrical conductors forming each winding. In various embodiments, each of the primary windings includes multiple layers, for example, two layers of electrical conductors, wherein a layer of winding is formed to encircle the inner winding(s) forming the primary windings.

In various embodiments, the inner most portion of each of the primary windings 301A, 301B, 301C may be formed to be in direct contact with an outer surface 311 of the center flow tube 310. The outer surface 311 of the center flow tube 310 may be circular in cross-section perpendicular to longitudinal axis 303 and completely encircling and enclosing a length of longitudinal axis 303, thus forming a cylindrical shaped coil winding surface for positioning primary windings 301A, 301B, 301C of the transformer 301.

A core 307 may be formed in a tubular shape that encircles both the outer surface 311 of the center flow tube 310 and the primary windings 301A, 301B, 301C of the transformer 301, and extends laterally along the longitudinal axis 303 of the sub-section 300 at least over the same length that includes the primary windings 301A, 301B, 301C. The core 307 may be formed from an electrically non-conductive material, such as ceramic. In some embodiments, the core 307 may be formed, at least in part, from an electrically conductive material, such as a metal, as further described below.

In addition to the primary windings 301A, 301B, 301C, transformer 301 includes at least one set of coils forming secondary winding 309. Secondary winding 309 may include a set of windings formed around and encircling the core 307 of the transformer 301. The secondary winding 309 may be formed from an electrical conductor, such as a wire and is formed as a coil winding that encircles the center flow tube 310, primary windings 301A, 301B, 301C, and the core 307 of the transformer. In various embodiments, the coil winding forming the secondary winding 309 of the transformer may be positioned to be in direct contact with the outer most surface of the core 307.

Although shown in FIG. 3 as being circular in cross-section, the cross-sectional shape of the electrical conductors forming secondary winding 309 is not limited to being circular. In various embodiments, the electrical conductors forming secondary winding 309 may have any closed shape in cross-section, including square, rectangular, triangular, elliptical, and/or oval shapes. In various embodiments, the area of each of the conductors forming secondary winding 309 may be in a range of 0.05 to 0.5 square inches, inclusive. The above-listed range is a non-limiting example, because this range can have other values depending on the material and other design parameters.

In various embodiments, a center point of each winding of the secondary winding may align with the center points of each of the other windings of the secondary winding so that the center points fall along a line that is parallel to longitudinal axis 303. In various embodiments, the center points of one or more windings of the secondary winding may be staggered with respect to a distance between the center point and longitudinal axis 303, so that the conductors forming the secondary winding do not align along a single line parallel to longitudinal axis 303, but for example may have adjacent windings formed at different distances from the longitudinal axis 303. In various embodiments, the windings of the secondary winding 309 includes a single layer of electrical conductors forming the secondary winding. In various embodiments, the windings forming the secondary winding incudes multiple layers, for example, two layers of electrical conductors, wherein a layer of windings is formed to encircle another inner layer or layers of winding(s) forming the secondary winding.

The entire assembly, including the center flow tube 310, the primary windings 301A, 301B, 301C, the core 307, and the secondary winding 309, may be included within a space encircled by a section of the tool body 302. In various embodiments, the tool body 302 is formed from a metal, and thus may be electrically conductive. As such, in various embodiments a space 318 between the secondary winding 309, which may include an insulative material provided in the space, may be included with the transformer to help eliminate possible electrical shorts between the secondary winding 309 and the tool body 302. This spacing may also aid in reducing eddy currents that may be generated in the tool body 302 due to the electromagnetic fields surrounding the secondary winding 309 during operation of the transformer. In addition, positioning the primary windings 301A, 301B, 301C closest to the center flow tube 310, and thus farther away from the tool body 302 compared to the secondary winding 309, may further reduce the eddy current issue that may occur in the tool body 302, as the primary windings 301A, 301B, 301C may carry larger currents compared to the current carried by secondary winding 309 of the transformer.

Dimensionally, the transformer 301 including the primary and secondary windings and the core must fit within the space defined between the outer surface 311 of the center flow tube (having outer dimension 313) and the inner surface of the tool body 302, or in other words having an outer most dimension 315, while also having a longitudinal (length) dimension 317 that does not exceed the space allocated for the transformer. By designing the transformer 301 in a compact manner, for example using the core 307, the distance included in the space 318 between the inner surface of the tool body and the outer most dimension 315 of the transformer may allow for minimizing the losses, such as eddy current losses, that may be attributed to the metal material used to form the tool body of the sub-section of the assembly where the transformer is positioned. By also positioning the secondary winding of the transformer closest to the tool body as described above, the losses, such as eddy current losses, may be further reduced, while providing an arrangement for transformer that can still accommodate a center flow tube passing through the sub-section of the assembly where the transformer is also located.

Because of the size restraints downhole (e.g., the width or diameter of the borehole) and the large amount of power that needs to be transformed in order to effectively perform pulse power operations, example embodiments include a transformer configured to satisfy these size restraints while being able to transform the large amount of power necessary for proper pulse power operations. In some embodiments, a length of the transformer is to extend along a longitudinal axis of the pulse power drilling assembly (as depicted). Also, in some embodiments, the length of the transformer is greater than a width of the transformer. For example, a length of the transformer is at least two times, five times, or 10 times greater than a width of the transformer.

Figure 4:
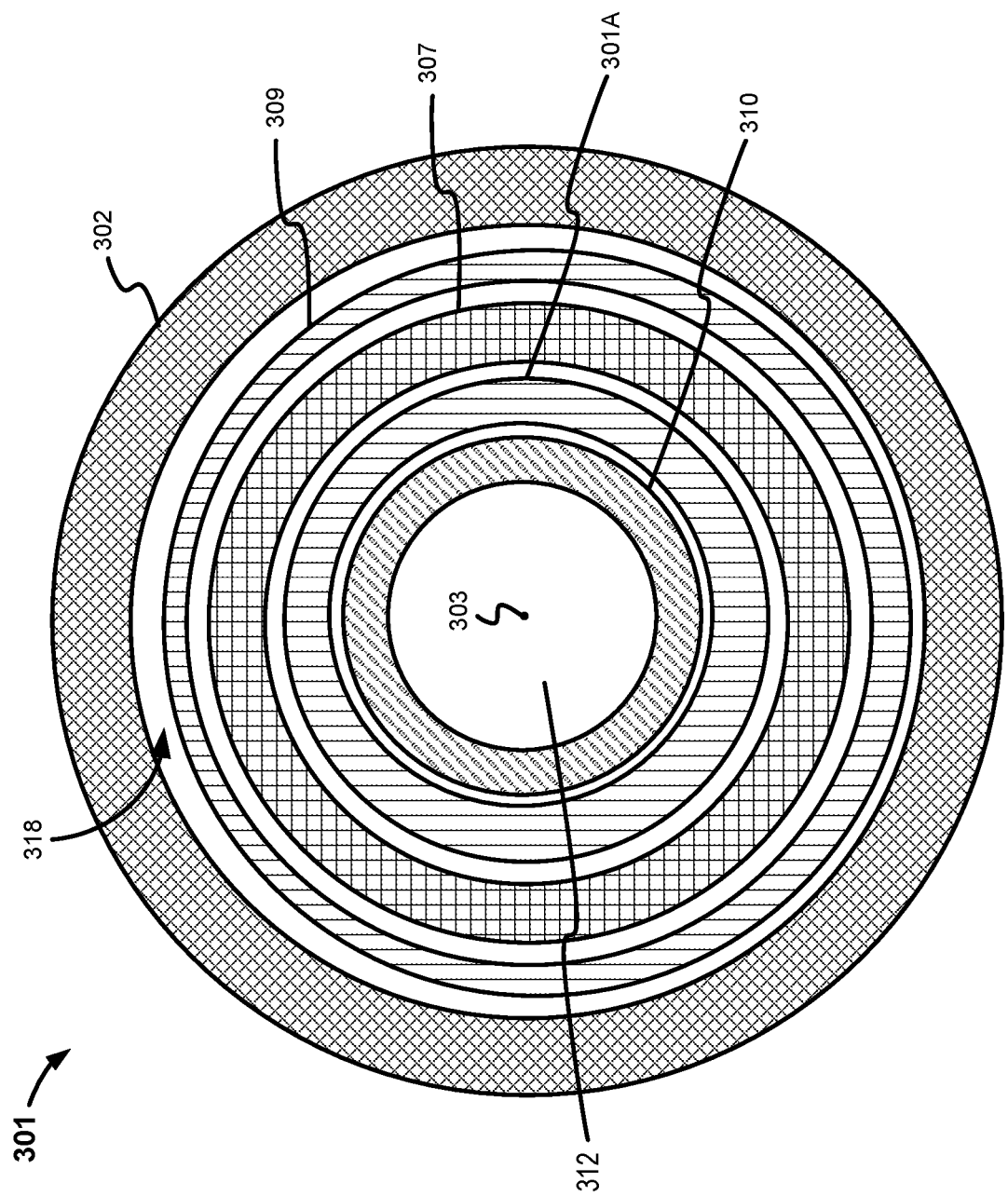
FIG. 4 illustrates a cross-sectional view of the transformer of FIG. 3, viewed along section line 4-4 in FIG. 3.

FIG. 4 illustrates a cross-sectional view of the transformer 301 of FIG. 3, viewed along section line 4-4 in FIG. 3. As shown in FIG. 4, a center flow tube 310 encircles the longitudinal axis 303 of the assembly, and includes the fluid passageway 312 that extends through the entirety of the center flow tube 310 along the longitudinal axis 303 within the sub-section that includes the transformer 301. The primary windings (illustratively represented as primary winding 301A) of the transformer encircle the outer surface of the center flow tube 310. In various embodiments, the primary windings are formed to be in direct physical contact with the outer surface of the center flow tube 310.

The core 307 encircles both the center flow tube 310 and the primary windings 301A of the transformer 301. The secondary winding 309 of the transformer 301 are formed around and encircle the core 307, and therefore, also encircle both the center flow tube 310 and the primary windings 301A of the transformer 301. The tool body 302 encircles the transformer 301 along the longitudinal axis 303 of the assembly, and is configured to couple with additional tool bodies of sub-sections of the assembly that are adjoined to the sub-section housing the transformer 301.

In various embodiments, the core 307 is formed from a non-conductive material, such as a ceramic material, and is formed in a tubular shape at least partially enclosing a hollow cylindrical space encircled by the inner wall of the core 307 and having the center flow tube 310 and the primary windings 301A positioned within the hollow cylindrical shape. The secondary winding 309 is formed around the outer surface of the core 307. As such the core 307 may provide some of the physical structure for supporting the primary windings 301A and the secondary winding 309 while also forcing a separation distance between the primary windings and the secondary winding based on the wall thickness and diameter in the cross-section of the outer diameter of the core itself. Other variations of the core are further illustrated and described below with respect to FIGS. 5A-5C.

Figure 5B:
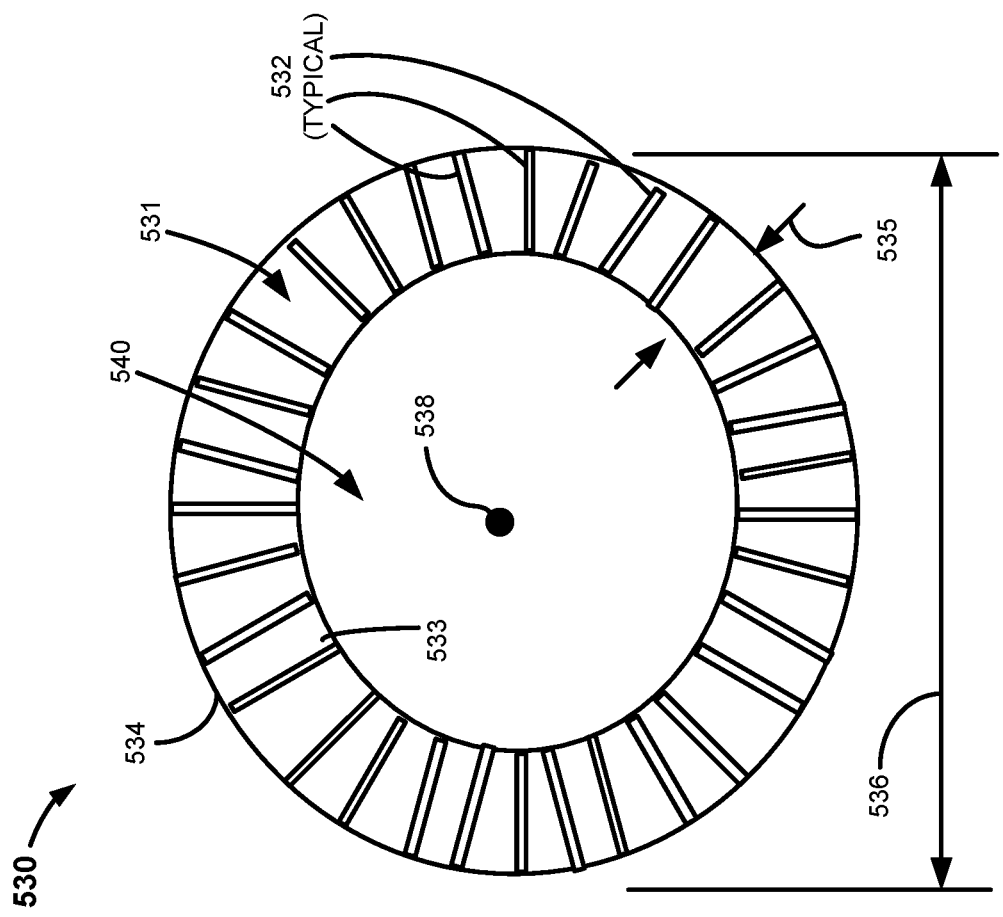
FIG. 5B illustrates embodiments of a core including radial laminate non-magnetic plates, which may be utilized in a transformer of a pulse power drilling assembly, according to some embodiments.
Figure 5A:
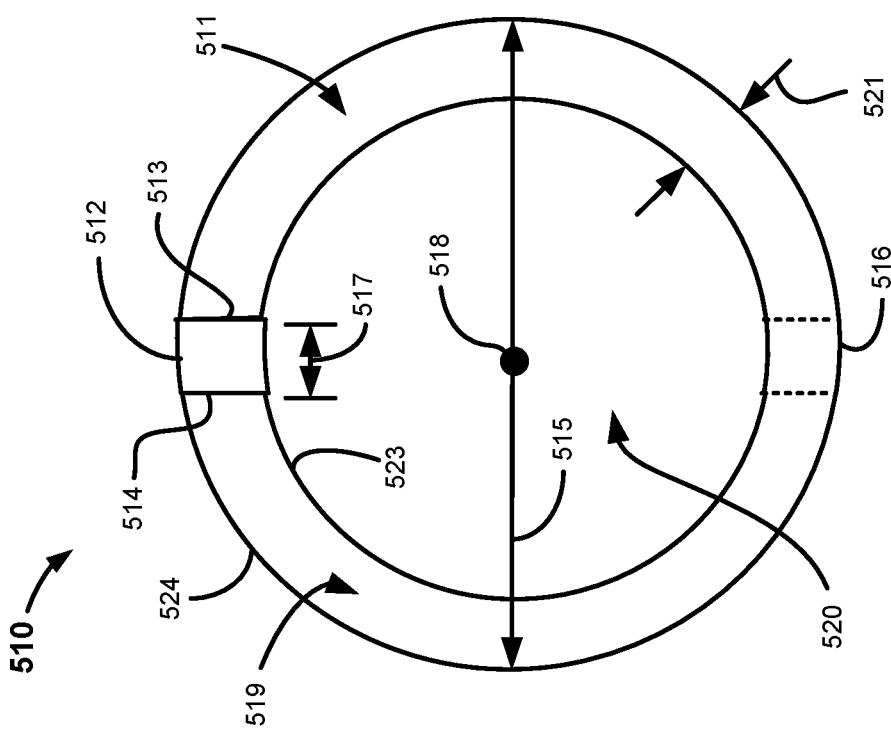
FIG. 5A illustrates embodiments of a core, including one or more insulative breaks, which may be utilized in a transformer of a pulse power drilling assembly, according to some embodiments.

FIG. 5A illustrates embodiments of a core 510, including one or more insulative breaks, which may be utilized in a transformer of a pulse power drilling assembly, according to various embodiments. As shown in FIG. 5A, core 510 is viewed in cross-section, for example as illustrated in FIG. 4 by section line 4-4. Core 510 may be an embodiment of a core included as part of any of the transformers illustrated and described throughout this disclosure, and in any equivalents thereof. As shown in FIG. 5A, the core 510 may be formed from a tubular section 511, which may comprise a metallic material, such as an iron or ferrous based metal, and which partially encircles a hollow passageway 520 extending along a longitudinal axis 518 of the core.

The core 510 may be formed as a tubular shape extending along a length of longitudinal axis 518 and comprising a core wall having at least one break 512 in the circular shape of the core. The break may also extend along the length of the longitudinal axis 518, thus separating a section of the core wall of the core along a section of the core running parallel to the longitudinal axis. The break 512 may be formed from an electrically insulative material, such as ceramic, and extending between a first end 513 and a second end 514 of the core wall of the core, wherein first end 513 and second end 514 are positioned proximate to each other with a space between the ends having a dimension 517 in a range from 0.1 to 1 inches, inclusive. In various embodiments, break 512 extends from inner surface 523 to outer surface 524 of core 510 along the entirety of the length of the core relative to the length dimension of the core extending along longitudinal axis 518. Core 510 may have a circular shape in cross-section, wherein an overall diameter 515 for the outer surface of core 510 may be in a range from 1 to 15 inches, inclusive. In various embodiments, a core wall thickness 521 for core 510 may in a range from 0.25 to 3 inches, inclusive. The above-listed ranges and dimensions are non-limiting examples, because such ranges and dimensions can have other values depending on the material and other design parameters.

As shown in FIG. 5A, the core 510 may have just one break, such as break 512, or may include additional break(s) formed from an insulative material, such as break 516, illustratively represented by the dashed lines at the bottom portion of the core 510. Break 516 may comprise a same or similar material used to form break 512 and may have physical dimensions the same as or similar to break 512. In various embodiments that include a second break, such as break 516, core 510 comprises a second tubular or curved section 519, which is separated from tubular section 511 by both break 512 and break 516. Second section 519 may be formed of a same material used to form section 511 in various embodiments. Embodiments of core 510 may include more than two separate breaks, wherein each of the breaks is positioned apart from one in a radial fashion around the core wall, each break separating two ends of the core wall from one another by the dimensions of the break. By including metallic material, core 510 may provide electromagnetic coupling between one or more primary windings of a transformer, for example on one side of the core wall (e.g., inside inner surface 523 of the core wall), and a secondary winding fore on the opposite side of the core wall (e.g. around or proximate to the outside surface 524 of the core wall of the core), while the one or more breaks function to reduce eddy current, and thus eddy current losses, in the core itself, during times when the transformer is powered.

FIG. 5B illustrates embodiments of a core 530 including radial laminate non-magnetic plates 532, which may be utilized in a transformer of a pulse power drilling assembly, according to some embodiments. As shown in FIG. 5B, core 530 is viewed in cross-section, for example as illustrated in FIG. 4 by section line 4-4. Core 530 may be an embodiment of a core included as part of any of the transformers illustrated and described throughout this disclosure, and in any equivalents thereof. As shown in FIG. 5B, the core 530 may be formed from in a tubular shape, having an inner surface 533 encircling the longitudinal axis 538 of the core and spaced at a radial distance away from the longitudinal axis 538, forming a tubular shaped hollow passageway 540. An outer surface 534 encircles the inner surface 533 at a radial distance away from the longitudinal axis that is greater than the distance between the longitudinal axis and the inner wall, thus forming the core wall between the inner surface 533 and the outer surface 534. The core wall may have a thickness dimension 535 in a range from 0.25 to 3 inches, inclusive. The above-listed range is a non-limiting example, because this range can have other values depending on the material and other design parameters. In various embodiments of core 530, the core wall comprises a non-conductive or insulative material 531, such as a high temperature epoxy. The insulative material 531 is embedded with a series of non-magnetic plates 532. These non-magnetic plates 532 may be straight sections which are embedded in a radial arrangement within the insulative material forming core 530. The non-magnetic plates may also have different configurations, such as interlocking shapes from which the tube is constructed. Each of the non-magnetic plates 532 in some embodiments extend throughout the tubular shape of the core wall along the length dimension of the core that is parallel to longitudinal axis 538, and where each of the non-magnetic plates 532 are separated from one and other and electrically insulated from one another by the insulative material forming the core wall. In various embodiments, non-magnetic plates 532 do not extend to inner surface 533, and/or do not extend to outer surface 534, so that the non-magnetic plates are not exposed at least at the inner surface and/or at the outer surface.

Core 530 may have a circular shape with respect to outer surface 534, and an outer diameter 536 in a range from 1 to 15 inches, inclusive. The above-listed range is a non-limiting example, because this range can have other values depending on the material and other design parameters. By including non-magnetic plates 532 embedded within the insulative material forming core 530, core 530 may provide electromagnetic coupling between one or more primary windings of a transformer for example on one side of the core wall (e.g., inside inner surface 533 of the core wall), and a secondary winding formed on the opposite side of the core wall (e.g. around or proximate to the outer surface 534 of the core wall of the core), while the non-magnetic plates function to reduce eddy current, and thus eddy current losses, in the core itself, during times when the transformer is powered.

Figure 5D:
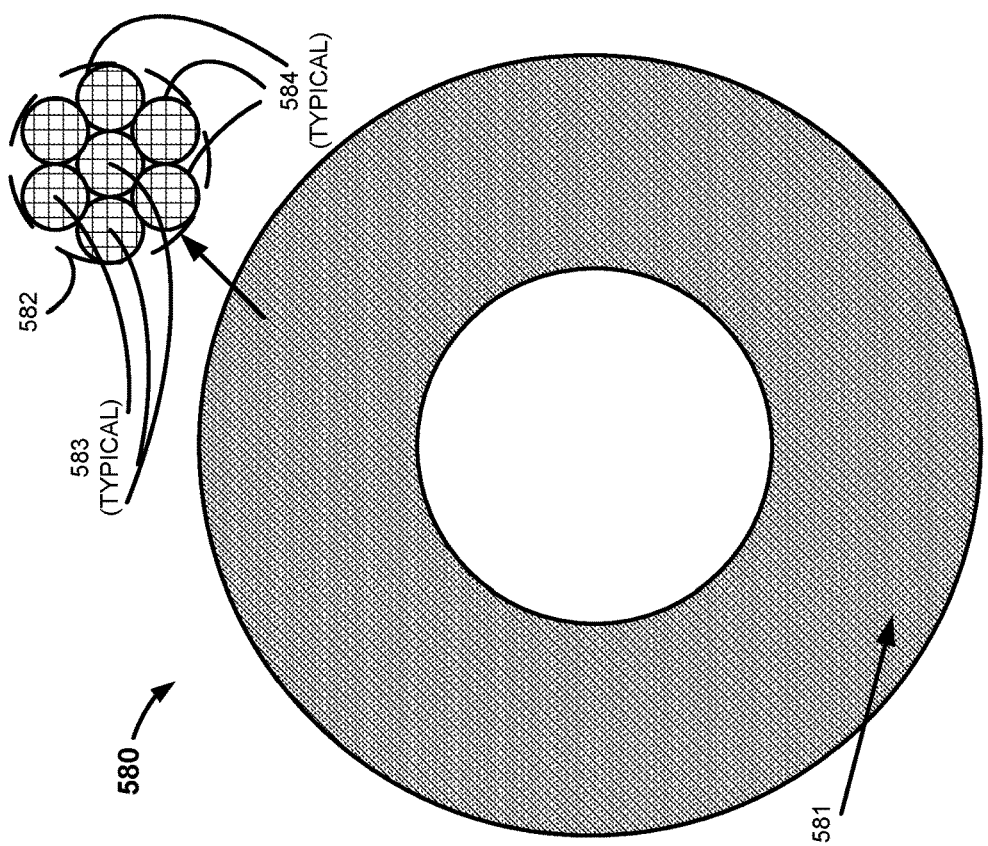
FIG. 5D illustrates embodiments of a core including a non-magnetic powder coated with non-conductive material, which may be utilized in a transformer of a pulse power drilling assembly, according to some embodiments.
Figure 5C:
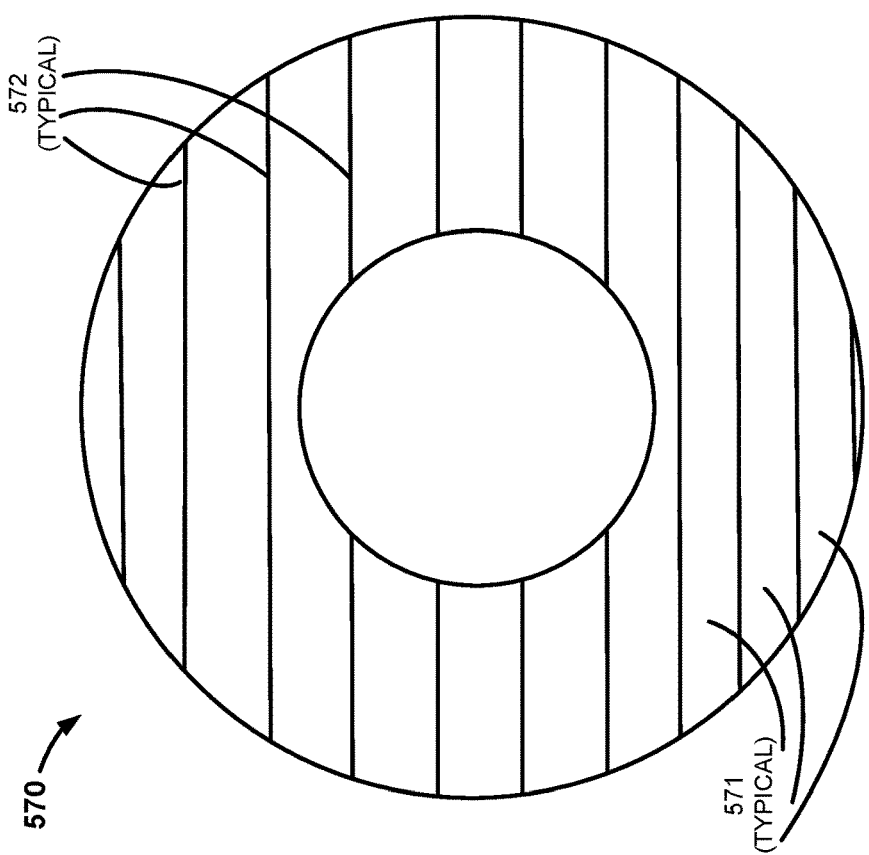
FIG. 5C illustrates embodiments of a core including straight laminate non-magnetic plates, which may be utilized in a transformer of a pulse power drilling assembly, according to some embodiments.

FIG. 5C illustrates embodiments of a core including straight laminate non-magnetic plates, which may be utilized in a transformer of a pulse power drilling assembly, according to some embodiments. As shown in FIG. 5C, core 570 is viewed in cross-section, for example as illustrated in FIG. 4 by section line 4-4. Core 570 may be substantially similar in dimension and configuration to the core 530 of FIG. 5B. In various embodiments of core 570, the core comprises horizontal alternating layers of materials. The alternating layers may comprise layers of non-magnetic plates 571 separated by layers of non-conductive laminate materials 572. The thickness of the non-magnetic plates 571 and the non-conductive laminate materials 572 illustrated in FIG. 5C are for example purposes only. While the non-magnetic plates 571 are depicted as thicker than the layers of non-conductive laminate materials 572, the alternating layer may be equal, or the layers of non-conductive laminate materials 572 may be thicker than the non-magnetic plates 571. For example, each plate of the non-magnetic plates 571 may have a thickness in a range from 0.1 to 0.5 inches, inclusive. Each layer of the non-conductive laminate materials 572 may have a thickness in a range from 0.05 to 0.5 inches, inclusive. The above-listed ranges and dimensions are non-limiting examples, because such ranges and dimensions can have other values depending on the material and other design parameters.

FIG. 5D illustrates embodiments of a core including a non-magnetic powder coated with non-conductive material, which may be utilized in a transformer of a pulse power drilling assembly, according to some embodiments. As shown in FIG. 5D, core 580 is viewed in cross-section, for example as illustrated in FIG. 4 by section line 4-4. Core 580 may be substantially similar in dimension and configuration to the core 530 of FIG. 5B. Core 580 may be substantially similar in dimension and configuration to the core 530 of FIG. 5B. In various embodiments of the core 580, the core 580 may be a core comprised of powder core 581. A call out 582, indicated by a dashed line circle, illustrates a close-up detail of the powder core 581. The powder core 581 may comprise units of powder 583 surrounded by and/or coated with a non-conductive material 584. While the units of powder 583 and the non-conductive material 584 are depicted in a uniform, circular pattern in FIG. 5D, the pattern may be irregular and/or the units of powder may comprise different shapes. The powder 583 coated with the non-conductive material 584 may prevent current flow in the core 580.

Figure 5E:
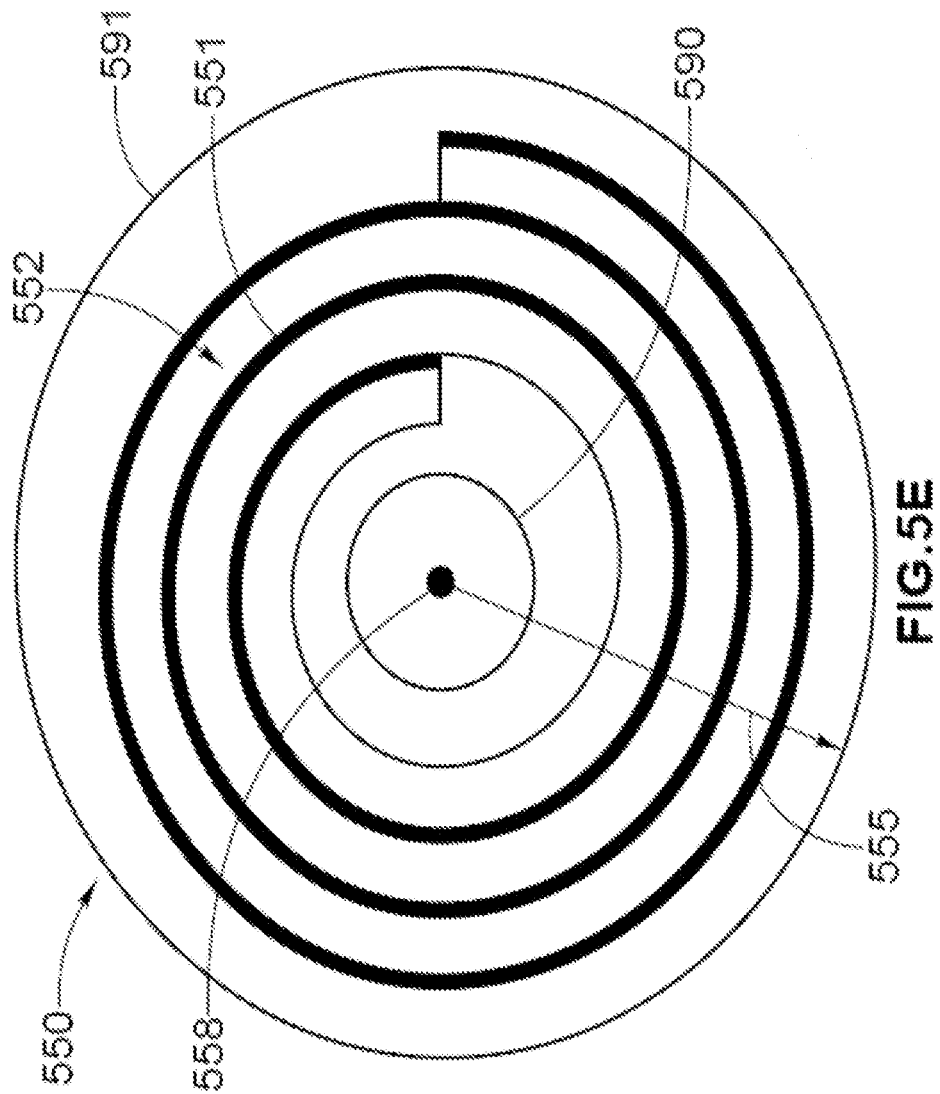
FIG. 5E illustrates a core having a first example spiral configuration (having an insulative layer outside of an electrically conductive layer) that is part of a transformer of a pulse power drilling assembly, according to some embodiments.

FIG. 5E illustrates a core having a first example spiral configuration (having an insulative layer outside of an electrically conductive layer) that is part of a transformer of a pulse power drilling assembly, according to some embodiments. FIG. 5E depicts a cross-sectional view of a core 550, which can be an example of the cross-section of section line 4-4 of FIG. 3.

The core 550 may be an embodiment of a core included as part of any of the transformers illustrated and described throughout this disclosure, and in any equivalents thereof. As shown in FIG. 5E, the core 550 may be formed in a tubular shape. The core 550 may circumferentially surround an outer surface of a flow tube 590. The core 550 may encircle a longitudinal axis 558 of a tool body and may be spaced at a radial distance away from the longitudinal axis 558. A tool body 591 encircles the core 550 at a radial distance away from the longitudinal axis that is greater than the distance between the longitudinal axis 558 and the flow tube 590.

The core includes an insulative layer 551 and an electrically conductive layer 552 such that the insulative layer positioned outside the electrically conductive layer 552. The electrically conductive layer 552 may comprise a sheet of electrically conductive material, such as copper or aluminum, and which may be wound into a spiral shape that encircles the outer surface of the flow tube 590 and extends in a spiral routing out toward the tool body 591. In various embodiments, the insulative layer 551 is placed in the spaces between the individual layers of the electrically conductive layer 552 to provide electrical isolation between the individual layers relative to the adjacently positioned portions of the electrically conductive layer 552, for example relative to a radial 555 extending from the longitudinal axis to the tool body 591. In addition, the edge of the electrically conductive layer 552 extending along the core 550 closest to the flow tube 590 may not extend to the flow tube 590 and may not be coupled to any other electrical conductor. The edge of the electrically conductive layer 552 extending along or closest to the tool body 591 may not extend to the tool body 591, and also may not be coupled to any other electrical conductor. As such, there is no path for a flow of current that may be generated in the core 550 as a result of the exposure of the electrically conductive layer 552 to electromagnetic fields that may be generated during the operation of the transformer where the core 550 is located. As such, the electrically conductive layer 552 may not result in a loss of efficiency of the transformer due, for example, to eddy current losses.

Figure 5F:
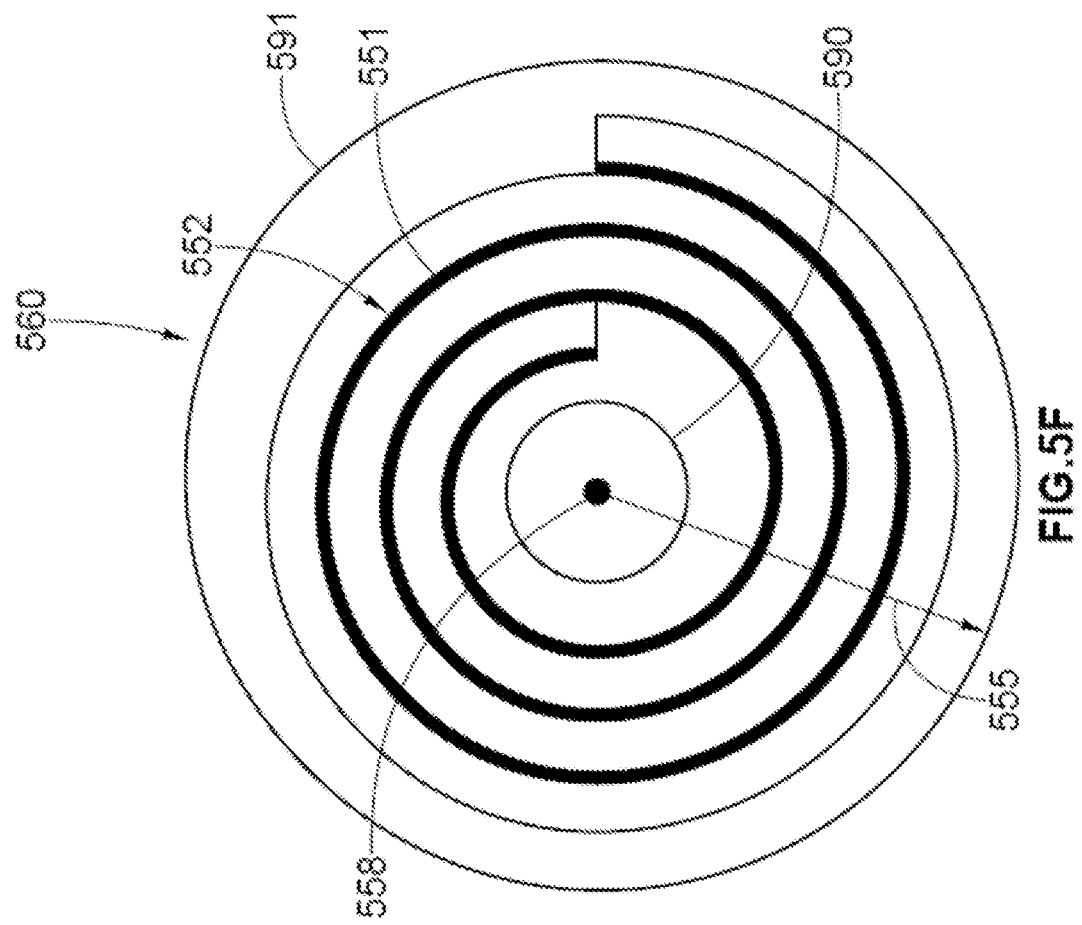
FIG. 5F illustrates a core having a second example spiral configuration (having an insulative layer inside of an electrically conductive layer) that is part of a transformer of a pulse power drilling assembly, according to some embodiments.

FIG. 5F illustrates a core having a second example spiral configuration (having an insulative layer inside of an electrically conductive layer) that is part of a transformer of a pulse power drilling assembly, according to some embodiments. FIG. 5F depicts a cross-sectional view of a core 560, which can be an example of the cross-section of section line 4-4 of FIG. 3. The core 560 is similar to the core 550 of FIG. 5E except for the relative positions of the insulative layer and the electrically conductive layer. In particular, an insulative layer 553 is positioned inside of the electrically conductive layer 552.

The core 560 may be an embodiment of a core included as part of any of the transformers illustrated and described throughout this disclosure, and in any equivalents thereof. As shown in FIG. 5F, the core 560 may be formed in a tubular shape. The core 560 may circumferentially surround an outer surface of the flow tube 590. The core 560 may encircle the longitudinal axis 558 of a tool body and may be spaced at a radial distance away from the longitudinal axis 558. The tool body 591 encircles the core 560 at a radial distance away from the longitudinal axis that is greater than the distance between the longitudinal axis 558 and the flow tube 590.

Figure 5G:
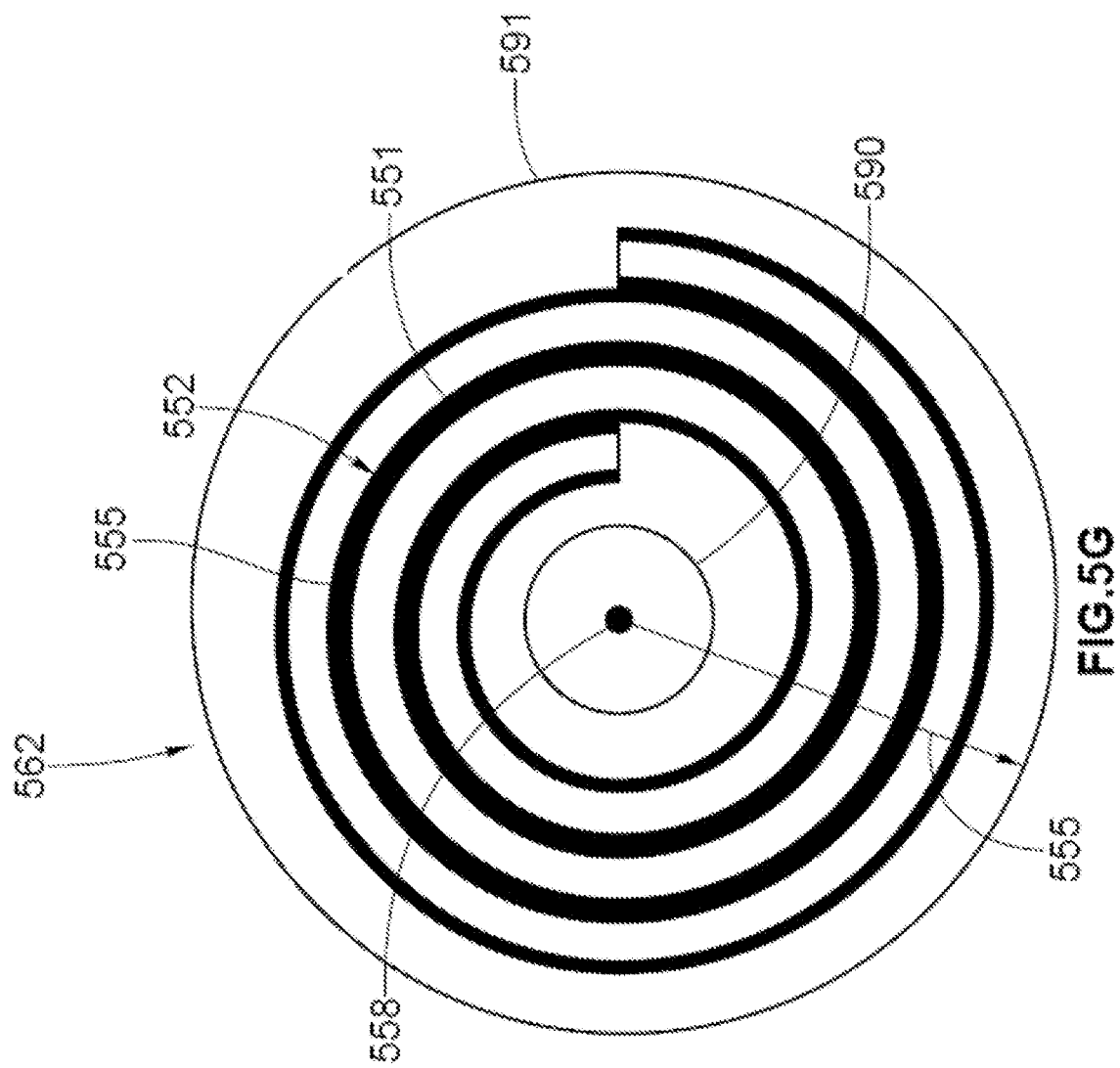
FIG. 5G illustrates a core having a third example spiral configuration (having a first insulative layer outside of the electrically conductive layer and a second insulative layer inside of the electrically conductive layer) that is part of a transformer of a pulse power drilling assembly, according to some embodiments.

FIG. 5G illustrates a core having a third example spiral configuration (having a first insulative layer outside of the electrically conductive layer and a second insulative layer inside of the electrically conductive layer) that is part of a transformer of a pulse power drilling assembly, according to some embodiments. FIG. 5G depicts a cross-sectional view of a core 562, which can be an example of the cross-section of section line 4-4 of FIG. 3. The core 562 is similar to the core 550 of FIG. 5E except for a second insulative layer (an insulative layer 555) that is positioned inside of the electrically conductive layer 552. This is in addition to the insulative layer 551 that is positioned on the outside of the electrically conductive layer 552.

The core 562 may be an embodiment of a core included as part of any of the transformers illustrated and described throughout this disclosure, and in any equivalents thereof. As shown in FIG. 5G, the core 562 may be formed in a tubular shape. The core 562 may circumferentially surround an outer surface of the flow tube 590. The core 562 may encircle the longitudinal axis 558 of a tool body and may be spaced at a radial distance away from the longitudinal axis 558. The tool body 591 encircles the core 562 at a radial distance away from the longitudinal axis that is greater than the distance between the longitudinal axis 558 and the flow tube 590.

While FIG. 5A-5G are described with respect to a core, the configuration of the core may be applied to other parts of the transformer, such as the outer tool body and the center flow tube. For example, in one embodiment the outer tool body may comprise a spiral configuration, as depicted in FIG. 5E. In this example embodiment, the spiral configuration of the outer tool body encircles the center flow tube and the core. In some embodiments, the center flow tube, the core, and the outer tool body may all exhibit a similar configuration. For example, each component may exhibit a spiral configuration as depicted in FIG. 5E. In other embodiments, the components may each have a different configuration. The configuration of the center flow tube, the core, and the outer tool body may exhibit any combination of configurations as depicted in FIGS. 5A-5G. Other possible configurations may also be used.

Example Operations

Figure 6:
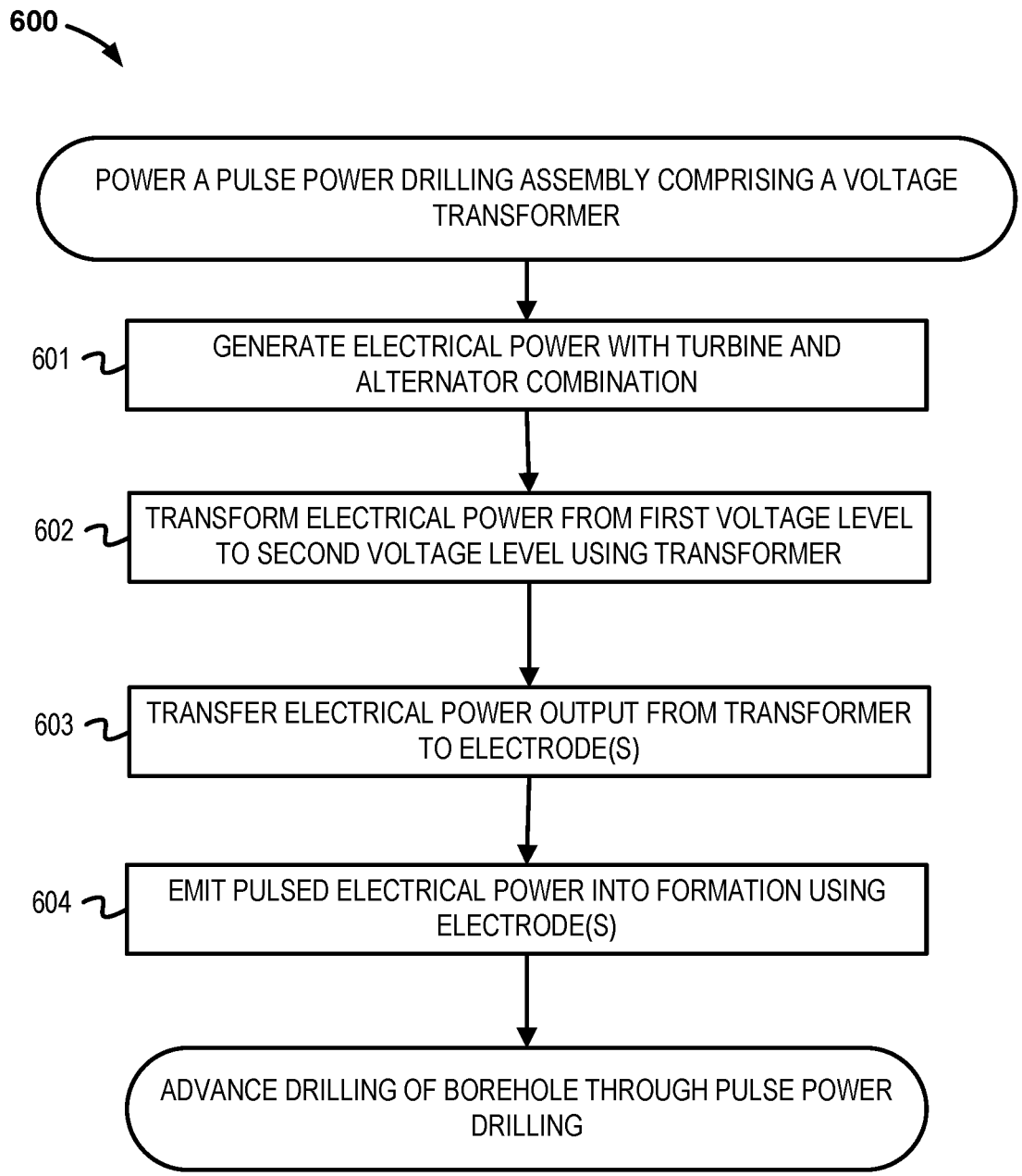
FIG. 6 depicts a flowchart of operations for powering a pulse power drilling assembly using a transformer, according to some embodiments.

FIG. 6 depicts a flowchart of operations for powering a pulse power drilling assembly using a transformer, according to some embodiments. The pulse power drilling assembly may be substantially similar to the assembly of FIG. 1. The transformer may be substantially the same or similar to any of the transformers or portions of the transformer illustrated and described with respect to FIGS. 1-5C. Operations of a flowchart 600 of FIG. 6 begin at block 601.

At block 601, a turbine and an alternator combination generates power in a pulse power drilling assembly, such as the assembly of FIG. 1. Drilling fluid from the surface flows through the drill string of the assembly to the turbine and alternator combination. The moving drilling fluid moves blades of the turbine which in turn imparts rotational energy to a rotor of the turbine. The turbine extracts the energy from the moving fluid and converts the energy into work. When the turbine is combined with a power generator, such as an alternator, the alternator converts the work into electrical power. The turbine may be an impulse turbine, a reaction turbine, or any other type of turbine.

At block 602, a transformer ("transformer") transforms the power generated by the turbine and alternator combination into a power that can be used by the electrodes of the assembly. The transformer may be the same or similar to any of the transformers described with respect to FIGS. 2-5C. The transformer includes a primary and secondary set of windings that would around a center flow tube extending through the windings along a longitudinal axis of the tool. The primary windings and secondary windings have different inductances that allow the transformer to convert the power generated power from a lower voltage into a higher voltage. The secondary windings have a greater number of turns than the primary windings to step-up or increase the voltage. The ratio of turns between the primary and secondary windings partially determines the increase in voltage. The current in the primary windings also impacts the voltage.

The primary and secondary windings are wound around a core. When a voltage is applied to the primary windings, current flows through the primary windings which in turn generates a magnetic field that surrounds the primary windings according to Faraday's law of electromagnetic induction. The strength of the magnetic field builds as the current flow rises to its maximum value. As the magnetic field expands outward from the primary windings, the core forms a path for and concentrates a magnetic flux in response to the magnetic field. The magnetic flux links the turns of the primary and secondary windings. When the magnetic lines of flux flow around the core, they pass through the turns of the secondary windings, causing a voltage to be induced in the secondary windings. As a result, the total induced voltage in each winding is directly proportional to the number of turns in the secondary winding. However, the peak amplitude of the output voltage available on the secondary windings will be reduced if the magnetic losses of the core are high. Embodiments of the core described in FIGS. 5A-C can be used to reduce the magnetic losses of the core. The electrical energy produced from the transformer is controllably stored in a second capacitor of the transformer.

At block 603, the transformer transfers power to the electrodes of the assembly. A pulse power control unit electrically couples the transformer to the electrodes. The pulse power control unit further processes and controllably provides the electrical power from the transformer to the electrodes. The pulse power control unit extracts or releases the power stored in the second capacitor of the transformer to power the electrodes during pulse power drilling operations.

At block 604, the electrodes emit the power into the formation. The electrodes emit a form of pulsed power plasma that deteriorates the formation surrounding the electrodes. The circulation of drilling fluid out of the assembly and back toward the surface removes any lose formation substance from the emission of power. This process of deteriorating the formation and removing the deteriorated substance from the borehole advances the drilling of the borehole.

FIG. 6 is annotated with a series of numbers. These numbers represent stages of operations. Although these stages are ordered for this example, the stages illustrate one example to aid in understanding this disclosure and should not be used to limit the claims. Subject matter falling within the scope of the claims can vary with respect to the order and some of the operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing. The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Example Computer

Figure 7:
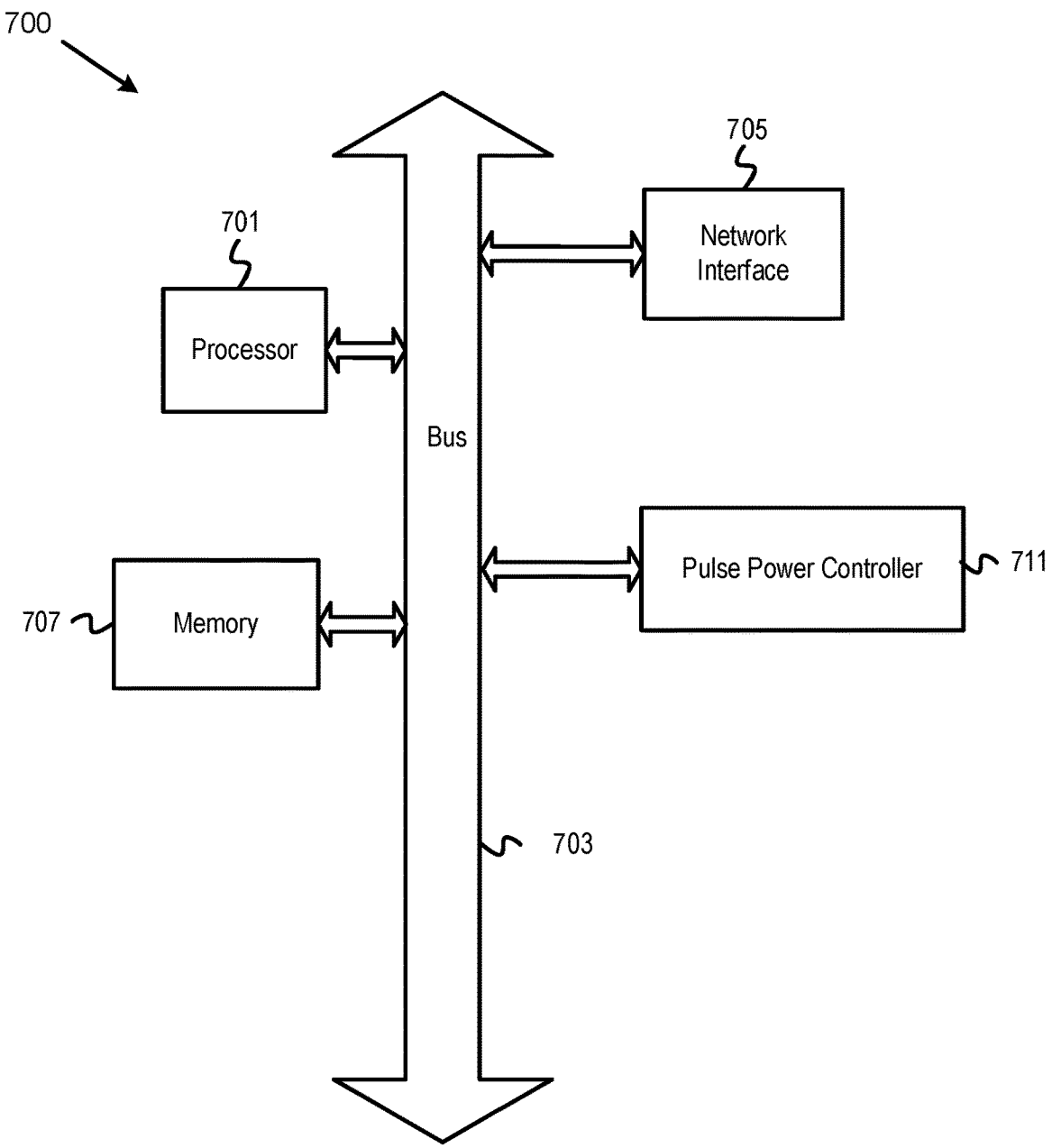
FIG. 7 depicts an example computer for a pulse power drilling assembly with a transformer, according to some embodiments.

FIG. 7 depicts an example computer for a pulse power drilling assembly with a transformer, according to some embodiments. A computer 700 includes a processor 701 (possibly including multiple processors, multiple cores, multiple nodes, and/or implementing multi-threading, etc.). The computer 700 includes a memory 707. The memory 707 may be system memory or any one or more of the above already described possible realizations of machine-readable media. The computer 700 also includes a bus 703 and a network interface 705. The computer 700 also includes a pulse power controller 711. The pulse power controller 711 may perform operations as described in FIG. 6, and/or any of the other control operations, such as control of switching devices, as described throughout this disclosure and any equivalent thereof. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled directly to the processor 701.

While the aspects of the disclosure are described with reference to various implementations and exploitations, it will be understood that these aspects are illustrative and that the scope of the claims is not limited to them. In general, techniques for powering a pulsed power drilling assembly as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Embodiments

Embodiment 1: An apparatus comprising: a sub-section of a pulse power drilling assembly including a transformer encircling a center flow tube, the transformer comprising, at least one primary winding that encircles the center flow tube; a core that encircles the at least one primary winding, wherein the core comprises, an insulative material; and an electrically conductive material, wherein the insulative material is positioned relative to the electrically conductive material to create at least one break to prevent an electrical path for current within the electrically conductive material during operation of the transformer; and a secondary winding that encircles the core.

Embodiment 2: The apparatus of Embodiment 1, wherein the transformer comprises a laminated tubular transformer.

Embodiment 3: The apparatus of Embodiments 1 or 2, wherein the insulative material is embedded with a series of non-magnetic plates.

Embodiment 4: The apparatus of Embodiment 3, wherein the series of non-magnetic plates comprise at least one of radial laminate non-magnetic plates, straight laminate non-magnetic plates, and interlocking non-magnetic plates.

Embodiment 5: The apparatus of any of Embodiments 1-4, wherein the electrically conductive material comprises an electrically conductive layer, wherein the insulative material comprises at least one insulative layer wherein the electrically conductive layer and that at least one insulative layer spiral from an inner wall of the core to an outer wall of the core.

Embodiment 6: The apparatus of Embodiment 5, wherein the at least one insulative layer is positioned outside the electrically conductive layer.

Embodiment 7: The apparatus of Embodiment 5, wherein the at least one insulative layer is positioned inside the electrically conductive layer.

Embodiment 8: The apparatus of Embodiment 5, wherein the at least one insulative layer comprises a first insulative layer positioned outside the electrically conductive layer and a second insulative layer positioned inside the electrically conductive layer.

Embodiment 9: The apparatus of any of Embodiments 1-8, wherein the core further comprises a non-magnetic powder coated with non-conductive material.

Embodiment 10: A method comprising: drilling a borehole using pulse power of a pulse power drill string, wherein the drilling comprises, generating power with a turbine and an alternator of the pulse power drill string; transforming, using a transformer of the pulse power drill string, the power from a first voltage to a second voltage that is higher than the first voltage, wherein the transformer comprises a core having an insulative material and an electrically conductive material, wherein the insulative material is positioned relative to the electrically conductive material to create at least one break to prevent an electrical path for current generated within the electrically conductive material during operation of the transformer; transferring the power to electrodes of the pulse power drill string; and emitting pulsed power into a formation using the electrodes based on the power.

Embodiment 11: The method of Embodiment 10, wherein the insulative material is embedded with a series of non-magnetic plates.

Embodiment 12: The method of Embodiment 11, wherein the series of non-magnetic plates comprise at least one of radial laminate non-magnetic plates, straight laminate non-magnetic plates and interlocking non-magnetic plates.

Embodiment 13: The method of any of Embodiments 10-12, wherein the electrically conductive material comprises an electrically conductive layer, wherein the insulative material comprises at least one insulative layer wherein the electrically conductive layer and that at least one insulative layer spiral from an inner wall of the core to an outer wall of the core.

Embodiment 14: The method of Embodiment 13, wherein the at least one insulative layer is positioned outside the electrically conductive layer.

Embodiment 15: The method of Embodiment 13, wherein the at least one insulative layer is positioned inside the electrically conductive layer.

Embodiment 16: The method of Embodiment 13, wherein the at least one insulative layer comprises a first insulative layer positioned outside the electrically conductive layer and a second insulative layer positioned inside the electrically conductive layer.

Embodiment 17: A system comprising: a pulse power drilling assembly to be positioned in a borehole formed in a subsurface formation, the pulse power drill assembly to drill the borehole based on periodic pulses of an electrical discharge into the subsurface formation, the pulse power drilling assembly comprising, an alternator to generate electrical power at a first voltage; at least one primary capacitor to store the electrical power at the first voltage, wherein, after at least one discharge criteria is satisfied, the at least one primary capacitor is to discharge the electrical power at the first voltage; a transformer coupling to the at least one primary capacitor and encircling a center flow tube, wherein the transformer comprises, at least one primary winding; a core encircling the at least one primary winding, wherein the core comprises, an insulative material; and an electrically conductive material, wherein the insulative material is positioned relative to the electrically conductive material to create at least one break to prevent an electrical path for current within the electrically conductive material during operation of the transformer; and a secondary winding encircling the core, wherein the transformer is to transform the electrical power from the first voltage to a second voltage that is higher than the first voltage; and at least one electrode to output a pulse of the periodic pulses of the electrical discharge into the subsurface formation based on the electrical power transformed to the second voltage.

Embodiment 18: The system of Embodiment 17, wherein the insulative material embedded is with a series of non-magnetic plates, wherein the series of non-magnetic plates comprise at least one of radial laminate non-magnetic plates, straight laminate non-magnetic plates and interlocking non-magnetic plates.

Embodiment 19: The system of Embodiments 17 or 18, wherein the electrically conductive material comprises an electrically conductive layer, wherein the insulative material comprises at least one insulative layer wherein the electrically conductive layer and that at least one insulative layer spiral from an inner wall of the core to an outer wall of the core.

Embodiment 20: The system of Embodiment 19, wherein the at least one insulative layer is positioned outside the electrically conductive layer.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. An apparatus comprising:
 a sub-section of a pulse power drilling assembly including a transformer encircling a center flow tube, the transformer comprising,
  at least one primary winding that encircles the center flow tube;
  a core that encircles the at least one primary winding, wherein the core comprises, an insulative material; and an electrically conductive material, wherein the insulative material is positioned relative to the electrically conductive material to create at least one break to prevent an electrical path for current within the electrically conductive material during operation of the transformer; and a secondary winding that encircles the core.

2. The apparatus of claim 1, wherein the transformer comprises a laminated tubular transformer.

3. The apparatus of claim 1, wherein the insulative material is embedded with a series of non-magnetic plates.

4. The apparatus of claim 3, wherein the series of non-magnetic plates comprise at least one of radial laminate non-magnetic plates, straight laminate non-magnetic plates, and interlocking non-magnetic plates.

5. The apparatus of claim 1, wherein the electrically conductive material comprises an electrically conductive layer, wherein the insulative material comprises at least one insulative layer wherein the electrically conductive layer and the at least one insulative layer spiral from an inner wall of the core to an outer wall of the core.

6. The apparatus of claim 5, wherein the at least one insulative layer is positioned outside the electrically conductive layer.

7. The apparatus of claim 5, wherein the at least one insulative layer is positioned inside the electrically conductive layer.

8. The apparatus of claim 5, wherein the at least one insulative layer comprises a first insulative layer positioned outside the electrically conductive layer and a second insulative layer positioned inside the electrically conductive layer.

9. The apparatus of claim 1, wherein the core further comprises a non-magnetic powder coated with non-conductive material.

10. A method comprising:

drilling a borehole using pulse power of a pulse power drill string, wherein the drilling comprises, generating power with a turbine and an alternator of the pulse power drill string;

transforming, using a transformer of the pulse power drill string, the power from a first voltage to a second voltage that is higher than the first voltage, wherein the transformer comprises a core having an insulative material and an electrically conductive material, wherein the insulative material is positioned relative to the electrically conductive material to create at least one break to prevent an electrical path for current generated within the electrically conductive material during operation of the transformer;

transferring the power to electrodes of the pulse power drill string; and emitting pulsed power into a formation using the electrodes based on the power.

11. The method of claim 10, wherein the insulative material is embedded with a series of non-magnetic plates.

12. The method of claim 11, wherein the series of non-magnetic plates comprise at least one of radial laminate non-magnetic plates, straight laminate non-magnetic plates and interlocking non-magnetic plates.

13. The method of claim 10, wherein the electrically conductive material comprises an electrically conductive layer, wherein the insulative material comprises at least one insulative layer wherein the electrically conductive layer and the at least one insulative layer spiral from an inner wall of the core to an outer wall of the core.

14. The method of claim 13, wherein the at least one insulative layer is positioned outside the electrically conductive layer.

15. The method of claim 13, wherein the at least one insulative layer is positioned inside the electrically conductive layer.

16. The method of claim 13, wherein the at least one insulative layer comprises a first insulative layer positioned outside the electrically conductive layer and a second insulative layer positioned inside the electrically conductive layer.

17. A system comprising:

a pulse power drilling assembly to be positioned in a borehole formed in a subsurface formation, the pulse power drill assembly to drill the borehole based on periodic pulses of an electrical discharge into the subsurface formation, the pulse power drilling assembly comprising, an alternator to generate electrical power at a first voltage;

at least one primary capacitor to store the electrical power at the first voltage, wherein, after at least one discharge criteria is satisfied, the at least one primary capacitor is to discharge the electrical power at the first voltage;

a transformer coupling to the at least one primary capacitor and encircling a center flow tube, wherein the transformer comprises, at least one primary winding;

a core encircling the at least one primary winding, wherein the core comprises, an insulative material; and an electrically conductive material, wherein the insulative material is positioned relative to the electrically conductive material to create at least one break to prevent an electrical path for current within the electrically conductive material during operation of the transformer; and a secondary winding encircling the core, wherein the transformer is to transform the electrical power from the first voltage to a second voltage that is higher than the first voltage; and at least one electrode to output a pulse of the periodic pulses of the electrical discharge into the subsurface formation based on the electrical power transformed to the second voltage.

18. The system of claim 17, wherein the insulative material embedded is with a series of non-magnetic plates, wherein the series of non-magnetic plates comprise at least one of radial laminate non-magnetic plates, straight laminate non-magnetic plates and interlocking non-magnetic plates.

19. The system of claim 17, wherein the electrically conductive material comprises an electrically conductive layer, wherein the insulative material comprises at least one insulative layer wherein the electrically conductive layer and the at least one insulative layer spiral from an inner wall of the core to an outer wall of the core.

20. The system of claim 19, wherein the at least one insulative layer is positioned outside the electrically conductive layer.

* * * * *